(12) United States Patent
Togawa

(10) Patent No.: US 9,612,898 B2
(45) Date of Patent: Apr. 4, 2017

(54) FAULT ANALYSIS APPARATUS, FAULT ANALYSIS METHOD, AND RECORDING MEDIUM

(71) Applicant: NEC Corporation, Minato-ku, Tokyo (JP)

(72) Inventor: Ryosuke Togawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/889,906

(22) PCT Filed: May 15, 2014

(86) PCT No.: PCT/JP2014/002569
§ 371 (c)(1),
(2) Date: Nov. 9, 2015

(87) PCT Pub. No.: WO2014/196129
PCT Pub. Date: Dec. 11, 2014

(65) Prior Publication Data
US 2016/0124792 A1 May 5, 2016

(30) Foreign Application Priority Data
Jun. 3, 2013 (JP) .................... 2013-116952

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0709* (2013.01); *G06F 11/0751* (2013.01); *G06F 11/0787* (2013.01)

(58) Field of Classification Search
USPC .......................................... 714/26
See application file for complete search history.

(56) References Cited

U.S. PATENT DOCUMENTS

| 2005/0172162 A1* | 8/2005 | Takahashi | G06F 11/0709 714/4.4 |
| 2011/0296244 A1* | 12/2011 | Fu | G06F 11/3608 714/37 |

(Continued)

FOREIGN PATENT DOCUMENTS

| JP | 2006-59266 A | 3/2006 |
| JP | 2006-146668 A | 6/2006 |

(Continued)

OTHER PUBLICATIONS

International Search Report for PCT Application No. PCT/JP2014/002569, mailed on Aug. 5, 2014.

(Continued)

*Primary Examiner* — Sarai Butler

(57) ABSTRACT

An apparatus includes: a log element extraction unit that extracts a log element from log information a combined unit that attaches, to each of the log elements, related system constituent element information and combine the log elements; a pattern extraction unit that extracts a pattern from the combined log information; a conversion unit, when an analysis target pattern includes system constituent element information of conversion target not included in a comparison target pattern, that performs conversion between the system constituent element information of the conversion target and the system constituent element information similar to the conversion target in the comparison target pattern or the analysis target pattern; a comparison unit that detects a difference the analysis target pattern and the comparison target pattern; and a presenting unit that presents, as a portion of a cause of a fault, the system constituent element information indicated by the difference.

10 Claims, 18 Drawing Sheets

(56) References Cited

U.S. PATENT DOCUMENTS

2012/0330639 A1    12/2012   Bisdikian et al.
2015/0378803 A1*   12/2015   Otsuka .................. G06F 11/079
                                                              714/37

FOREIGN PATENT DOCUMENTS

| JP | 4944391 B2   | 11/2006 |
| JP | 2011-192097 A | 9/2011 |
| JP | 2012-123694 A | 6/2012 |
| JP | 2012-141802 A | 7/2012 |

OTHER PUBLICATIONS

English translation of Written opinion for PCT Application No. PCT/JP2014/002569.

* cited by examiner

Fig. 6 mysqld.log
130201 09:04:01 mysqld started
130201 09:04:01 InnoDB : Started;
130201 09:04:01 [note] user/libexec/mysqld:

access.log
172.16.200.1 - - [2013/02/01 09:04:01] "GET /www/index.html
172.16.200.1 - - [2013/02/01 09:04:01] "GET /www/searchitems.html
172.16.200.3 - - [2013/02/01 09:05:03] "GET /www/buy.html message
Feb 01 09:04:01 node1 httpd[1305] ********
Feb 01 09:04:03 node1 httpd[1298] ********

Fig. 7

| LOG TYPE | FORMAT | NODE NAME | PROCESS NAME | MESSAGE |
|---|---|---|---|---|
| syslog | ¥D[3] ¥d{2}:¥d{2}:¥d{2} | ¥w+? | ¥w+?[¥d+?] | ¥w+? |
| | | LOG LEVEL | CATEGORY NAME | MESSAGE |
| log4j | ¥d{4}-¥d{2}-¥d{2} ¥d{2}:¥d{2}:¥d{2},¥d{3} | ¥w+? | ¥w+? | ¥w+? |
| ... | ... | ... | ... | ... |

Fig. 8

| IDENTIFICATION SYMBOL | CONSTITUENT ELEMENT NAME | CLASSIFICATION 1 | CLASSIFICATION 2 | LOCATION | LOG FILE PATH NAME (RELATED INFORMATION OF LOG INFORMATION) |
|---|---|---|---|---|---|
| A | Node1 | Server | Web server | 172.16.200.11 | /var/log/message |
| B | Node2 | Server | Web server | 172.16.200.12 | /var/log/message |
| ... | ... | ... | ... | ... | ... |
| V | Apache | Application | Apache | Node1 | /var/log/httpd/access_log |
| W | MySQL | Application | MySQL | Node3 | /var/log/mysqld.log |
| ... | ... | ... | ... | ... | ... |
| G | Application_Z | Application | Application_X | Node1 | /zzzz/zzz/zz |
| K | Application_X | Application | Application_X | Node2 | /xxxx/xxx/xx |
| L | Application_X | Application | Application_X | Node1 | /xxxx/xxx/xx |
| X | Application_Y | Application | Application_Y | Node1 | /yyyy/yyy/yy |
| ... | ... | ... | ... | ... | ... |

Fig. 9

| LOG ELEMENT (DATE AND TIME) | IDENTIFICATION INFORMATION | ATTRIBUTE INFORMATION |
|---|---|---|
| 2013/02/01 09:04:01 | V | node1, Server, Web server, Application, apache |
| 2013/02/01 09:04:01 | V | node1, Server, Web server, Application, apache |
| 2013/02/01 09:04:01 | W | node2, Server, DB server, Application, MySQL |
| 2013/02/01 09:04:01 | W | node2, Server, DB server, Application, MySQL |
| 2013/02/01 09:04:01 | W | node2, Server, DB server, Application, MySQL |
| 2013/02/01 09:04:01 | X | node3, Server, AP server, Application, Application_XX |

Fig. 10

| NUMBER | PATTERN | | | | | | | RATIO OF APPEARANCE |
|---|---|---|---|---|---|---|---|---|
| 1 | SYSTEM CONSTITUENT ELEMENT | A | F | G | G | L | H | 0.8 |
| | RELATIVE RATIO | 1 | 1 | 3 | 3 | 2 | 1 | |
| 2 | SYSTEM CONSTITUENT ELEMENT | A | F | G | K | | | 0.2 |
| | RELATIVE RATIO | 1 | 1 | 3 | 1 | | | |
| ... | ... | ... | | | | | | ... |

Fig. 16

| FORMAT ELEMENT | FORMAT |
|---|---|
| DATE | ¥d{4}/¥d{2}/¥d{2}, ¥D{3}/¥d{2}/¥d{4}, ··· |
| TIME | ¥d{2}:¥d{2}:¥d{2}, d{2}:¥d{2}:¥d{2},¥d{3} |
| NODE NAME | Node1, Node2, Node3 |
| APPLICATION NAME | Apache, MySQL, ··· |
| LOG LEVEL | DEBUG, INFO, ERROR, WARN, ··· |

Fig. 17

| LOG TYPE | FORMAT | | | | |
|---|---|---|---|---|---|
| syslog | DATE AND TIME | NODE NAME | PROCESS NAME | MESSAGE | |
| | ¥D{3} ¥d{2}:¥d{2}:¥d{2} | ¥w+? | ¥w+?[¥d+?] | ¥w+? | |
| log4j | DATE AND TIME | LOG LEVEL | CATEGORY NAME | MESSAGE | |
| | ¥d{4}-¥d{2}-¥d{2} ¥d{2}:¥d{2}:¥d{2}.¥d{3} | ¥w+? | ¥w+? | ¥w+? | |
| new1 | DATE AND TIME | TIME | LOG LEVEL | MESSAGE | |
| | ¥d{4}/¥d{2}/¥d{2} | ¥d{2}:¥d{2}:¥d{2} | ¥w+? | ¥w+? | |

NEW FORMAT

FAULT ANALYSIS APPARATUS, FAULT ANALYSIS METHOD, AND RECORDING MEDIUM

This application is a National Stage Entry of PCT/JP2014/002569 filed on May 15, 2014, which claims priority from Japanese Patent Application 2013-116952 filed on Jun. 3, 2013, the contents of all of which are incorporated herein by reference, in their entirety.

TECHNICAL FIELD

The present invention relates to a technique for analyzing a fault in an information processing system.

BACKGROUND ART

For example, related techniques described in PTLs 1 to 3 are known as techniques for analyzing a fault in an information processing system.

A fault analysis system described in PTL 1 holds a normal pattern of a processing sequence and an abnormal pattern during a fault. When the fault occurs, the fault analysis system obtains a pattern (search pattern) of a processing sequence, and analyzes the fault by collating the pattern with the normal pattern and the abnormal pattern. This fault analysis system determines normal operation in a case where the search pattern matches the normal pattern. This fault analysis system presents information about the abnormal pattern in a case where the search pattern matches the abnormal pattern. This fault analysis system holds the search pattern as a new abnormal pattern in a case where the search pattern matches neither the normal pattern nor the abnormal pattern.

A fault analysis system described in PTL 2 records a usual pattern for each period and the number of times of occurrences thereof with regard to a message collected in a learning mode during normal operation of an information processing system. Then, this fault analysis system determines that an abnormality is detected in a case where there is not any usual pattern that matches the pattern of the message collected in the operation mode, or in a case where the number of times of occurrences thereof is equal to or more than the upper limit or equal to or less than the upper limit based on the number of times of occurrences of the usual pattern.

A fault analysis system described in PTL 3 detects a fault by collating as to whether a message pattern obtained during a fault occurred in the past and a message pattern obtained during an operation match each other or not. For example, this fault analysis system accumulates message patterns during faults in the past in any given information processing system, and detects a fault in another information processing system by collating the message pattern with a message pattern obtained during an operation of the another information processing system. This fault analysis system performs collation by increasing the degree of abstraction for a portion where the message patterns do not match during collation.

CITATION LIST

Patent Literature

PTL 1: Japanese Unexamined Patent Application Publication No. 2006-59266
PTL 2: Japanese Patent No. 4944391
PTL 3: Japanese Unexamined Patent Application Publication No. 2012-141802
PTL 4: Japanese Unexamined Patent Application Publication No. 2012-123694

SUMMARY OF INVENTION

Technical Problem

However, the use of cloud computing and virtualized environment has expanded, recent information processing systems have become more complicated such as mixed presence of physical and virtual environments and hetero environments based on multi-vendors. In the complicated information processing system, the frequency of change in the configuration such as a change in a node configuration and update and addition of software dramatically increases. Each of the above related techniques described above involves a problem in that it is difficult to identify the portion of the cause of the fault in the complicated information processing system.

For example, the fault analysis system described in PTL 1 needs to hold the normal pattern and the abnormal pattern of the processing sequence for the fault analysis. In this case, in the complicated information processing system, products of multiple developers are often used in combination. For this reason, it is difficult for an operation administrator to find all of the processing sequences in the information processing system in advance. Therefore, in this fault analysis system, it is difficult to find a new normal processing sequence and generate a normal pattern every time the configuration of the information processing system changes.

In the information processing system of which configuration frequently changes, identical faults are less likely to occur repeatedly, and most of the faults are unknown cases. Therefore, when the configuration of the information processing system changes, the fault analysis system described in PTL 1 is less likely to detect a fault that matches the abnormal patterns that are held before that, and is more likely to detect a fault that matches neither the normal patterns nor the abnormal patterns. In this case, this fault analysis system records information about the portion of the cause of the held abnormal pattern in association with the held abnormal pattern, so that the fault analysis system presents the portion of the cause and the like of the abnormal pattern that matches a searched pattern. However, PTL 1 is silent on how to obtain information about the portion of the cause and the like associated with a new abnormal pattern when the searched pattern that does not match the abnormal patterns is held as the new abnormal pattern. Therefore, if a fault that has never occurred in the past in the complicated information processing system is detected, it comes to be difficult for this fault analysis system to present the portion of the cause.

The fault analysis system described in PTL 2 needs to record the usual pattern of a message and the number of times of occurrences thereof in the learning mode in advance. Accordingly, every time the configuration changes in the complicated information processing system, this fault analysis system needs to switch to the learning mode, and update the usual pattern and the number of times of occurrences thereof.

When the fault analysis system described in PTL 2 detects a pattern of a message that does not match the usual pattern or a message pattern of which number of times of occurrences is equal to or more than the upper limit or equal to or less than the lower limit as compared with the number of times of occurrences of the usual pattern, the fault analysis system described in PTL 2 presents the pattern of the message, the number of times of occurrences, and the like. At this occasion, when the fault is the same as a fault that occurred in the past, a user may be able to identify the portion of the cause of the fault from information about the pattern of the message, the number of times of occurrences, and the like. However, when a fault that has not occurred in the past is detected in the complicated information processing system, it comes to be difficult for the user to identify the portion of the cause of the fault only from information about the pattern of the message, the number of times of occurrences thereof, and the like. Therefore, if this fault analysis system detects a fault that has not occurred in the past in the complicated information processing system, it comes to be difficult to present the portion of the cause thereof.

The fault analysis system described in PTL 3 needs to store the message pattern when the fault occurred in the past. Then, when this fault analysis system compares the message pattern obtained during operation and the message pattern during the occurrence of the fault in the past, the fault analysis system performs the comparison by increasing the degree of abstraction of the non-matching portion in the pattern. If the message pattern during the occurrence of the fault in the past is determined to match when the degree of abstraction is increased, this fault analysis system presents the corresponding case of the fault in the past. However, as described above, in the complicated information processing system, the same fault is less likely to occur repeatedly, and most of the faults are unknown cases. For this reason, when the configuration changes as described above in the complicated information processing system, this fault analysis system cannot sufficiently detect a fault by just collating it with the message pattern when the fault occurred in the past. As a result, it is difficult for this fault analysis system to present the portion of the cause of the fault that has not occurred in the past.

In the complicated information processing system, a case of a fault is often unique to the system, and a case of a fault in the past in any given system seldom occurs in another information processing system. Therefore, the fault analysis system described in PTL 3 cannot sufficiently detect a fault in an information processing system that does not accumulate a message pattern during a fault in the past, and it is difficult to present the portion of the cause thereof.

The present invention is made in order to solve the above problem, and it is an object of the present invention to provide a technique for presenting information capable of accurately identifying a portion of a cause of a fault that has not occurred in the past in an information processing system of which configuration changes.

Solution to Problem

A fault analysis apparatus according to an exemplary aspect of the present invention includes: log element extraction means for extracting, from one or more pieces of log information which are output by an information processing system, a log element which is an element constituting the log information; log combined means for attaching, to each of the log elements, system constituent element information expressing a system constituent element related to the log element, the system constituent element being a constituent element of the information processing system, and generating combined log information by combining the log elements attached with the system constituent element information; pattern extraction means for extracting a pattern of information including the system constituent element information from the combined log information; pattern conversion means, when an analysis target pattern being the pattern extracted during an analysis target period in which an analysis is performed, includes system constituent element information of a conversion target which is system constituent element information not included in a comparison target pattern being a pattern stored in pattern storage means and being the pattern extracted during a comparison target period which is a period when a conversion is performed, for performing the conversion between the system constituent element information of the conversion target and the system constituent element information included in the comparison target pattern and similar to the system constituent element information of the conversion target in any one of the comparison target pattern and the analysis target pattern; pattern comparison means for detecting a difference by comparing the analysis target pattern and the comparison target pattern after conversion processing with the pattern conversion means; and cause portion presenting means for presenting, as a portion of a cause of a fault, the system constituent element information indicated by the difference detected by the pattern comparison means.

A fault analysis method of a fault analysis apparatus according to an exemplary aspect of the present invention, the fault analysis method includes: extracting, from one or more pieces of log information which are output by an information processing system, a log element which is an element constituting the log information; attaching, to each of the log elements, system constituent element information expressing a system constituent element related to the log element, the system constituent element being a constituent element of the information processing system, and generating combined log information by combining the log elements attached with the system constituent element information; extracting a pattern of information including the system constituent element information from the combined log information; when an analysis target pattern, which is the pattern extracted during an analysis target period, in which an analysis is performed includes system constituent element information of a conversion target which is system constituent element information not included in a comparison target pattern which is a pattern extracted during a comparison target period which is a period when a conversion is performed, performing the conversion between the system constituent element information of the conversion target and system constituent element information included in the comparison target pattern and similar to the system constituent element information of the conversion target in any one of the comparison target pattern and the analysis target pattern; detecting a difference by comparing the analysis target pattern and the comparison target pattern after conversion processing; and presenting, as a portion of a cause of a fault, the system constituent element information indicated by the difference detected.

A computer-readable recording medium according to an exemplary aspect of the present invention, the computer-readable recording medium records a computer program for causing a computer apparatus to execute: a log element extraction step for extracting, from one or more pieces of log information which are output by an information processing system, a log element which is an element constituting the log information; a log combined step for attaching, to each of the log elements, system constituent element information expressing a system constituent element related to the log element, the system constituent element being a constituent element of the information processing system, and generating combined log information by combining the log elements attached with the system constituent element information; a pattern extraction step for extracting a pattern of information including the system constituent element information from the combined log information; a pattern storing step for storing a comparison target pattern which is a pattern extracted by executing the log element extraction step, the log combined step, and the pattern extraction step on the log information during a comparison target period which is a period when a conversion is performed; a pattern conversion step, when an analysis target pattern which is the pattern extracted by executing the log element extraction step, the log combined step, and the pattern, extraction step on the log information during an analysis target period in which an analysis is performed, includes system constituent element information of a conversion target which is system constituent element information not included in the comparison target pattern, for performing the conversion between the system constituent element information of the conversion target and system constituent element information included in the comparison target pattern and similar to the system constituent element information of the conversion target in any one of the comparison target pattern and the analysis target pattern; a pattern comparison step for detecting a difference by comparing the analysis target pattern and the comparison target pattern after conversion processing; and a cause portion presenting step for presenting, as a portion of a cause of a fault, the system constituent element information indicated by the difference detected in the pattern comparison step.

Advantageous Effects of Invention

The present invention can provide a technique for presenting information capable of accurately identifying a portion of a cause of a fault that has not occurred in the past in an information processing system of which configuration changes.

BRIEF DESCRIPTION OF DRAWINGS

FIG. 6 is a figure illustrating an example of log information which is subjected to the second exemplary embodiment of the present invention.

FIG. 7 is a figure illustrating an example of information stored in a log format storage unit in the fault analysis apparatus according to the second exemplary embodiment of the present invention.

FIG. 8 is a figure illustrating an example of information stored in a system constituent element storage unit in the fault analysis apparatus according to the second exemplary embodiment of the present invention.

FIG. 9 is a figure illustrating an example of combined log information which is output by a log combining unit of the fault analysis apparatus according to the second exemplary embodiment of the present invention.

FIG. 10 is a figure illustrating an example of pattern and summary information summarized by a pattern summary unit of the fault analysis apparatus according to the second exemplary embodiment of the present invention.

FIG. 16 is a figure illustrating an example of information stored in a format element storage unit of the fourth exemplary embodiment of the present invention.

FIG. 17 is a figure illustrating an example of information newly added to the log format storage unit in the fourth exemplary embodiment of the present invention.

DESCRIPTION OF EMBODIMENTS

Hereinafter, an exemplary embodiment of the present invention will be explained in details with reference to drawings.

First Exemplary Embodiment

Figure 1:
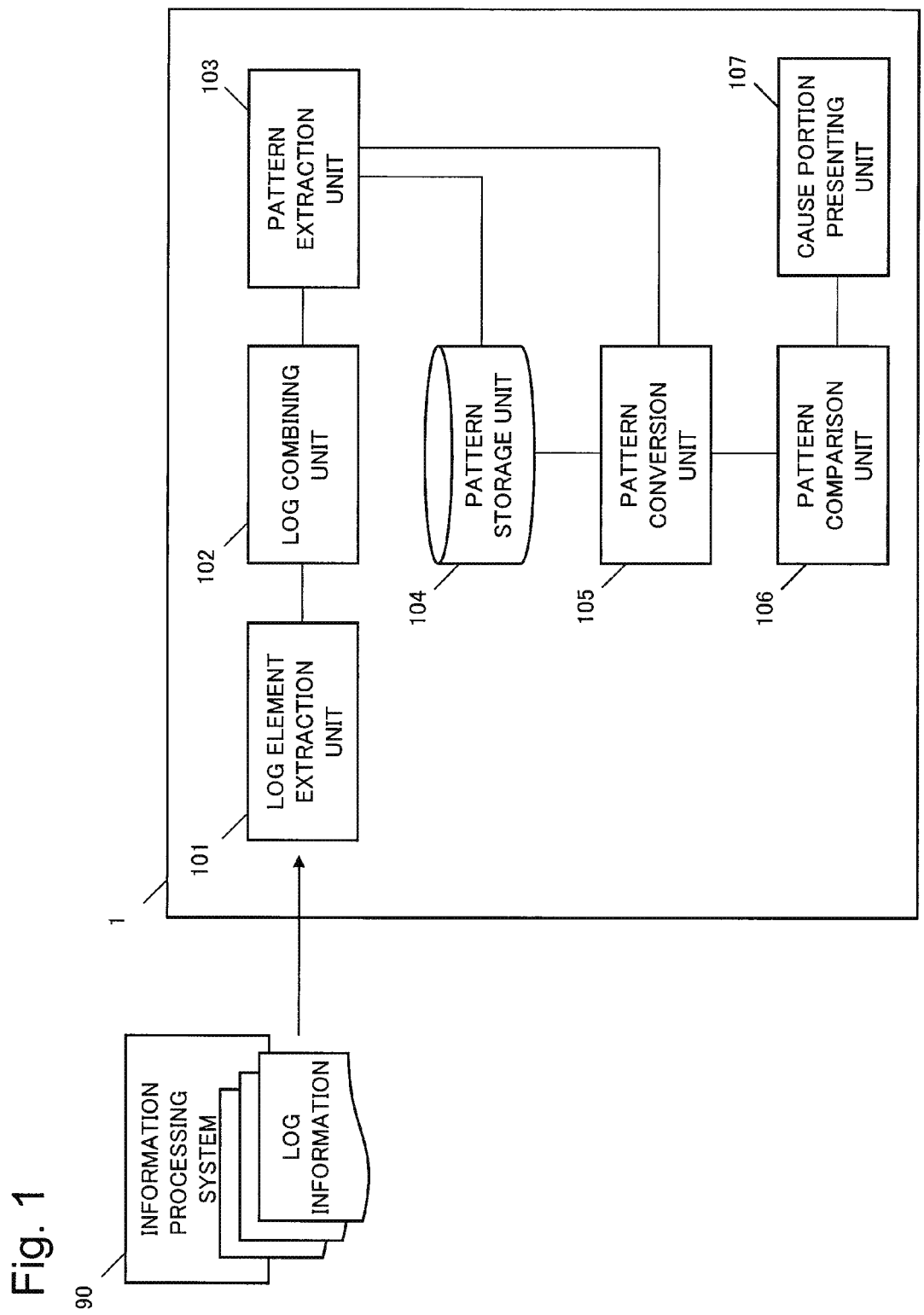
FIG. 1 is a functional block diagram illustrating functions of a fault analysis apparatus according to a first exemplary embodiment of the present invention.

A functional block diagram illustrating a functional configuration of a fault analysis apparatus 1 according to the first exemplary embodiment of the present invention will be shown in FIG. 1. In FIG. 1, the fault analysis apparatus 1 includes a log element extraction unit 101, a log combining unit 102, a pattern extraction unit 103, a pattern storage unit 104, a pattern conversion unit 105, a pattern comparison unit 106, and a cause portion presenting unit 107.

The fault analysis apparatus 1 is configured to be able to collect various kinds of log information which are output from the information processing system 90. In this case, the information processing system 90 is a system which is subjected to analysis of faults, and may be configured by one or more computer apparatus (nodes) connected by a network such as a Local Area Network (LAN) and the like. For example, the fault analysis apparatus 1 may be connected to the information processing system 90 via a network, so that the fault analysis apparatus 1 is configured to be able to collect various kinds of log information which are output from the information processing system 90. Alternatively, the fault analysis apparatus 1 may be achieved by the same computer apparatus as any one of the nodes constituting the information processing system 90, so that the fault analysis apparatus 1 is configured to be able to collect various kinds of log information which are output from the information processing system 90. In addition, the fault analysis apparatus 1 may be connected to a storage device directly storing or copying and storing various kinds of log information which are output from the information processing system 90, so that the fault analysis apparatus 1 is configured to be able to collect various kinds of log information.

The log information may be, for example, those that are output as a log file with constituent elements of the information processing system 90 (which may be hereinafter also referred to as system constituent elements). The system constituent elements may be, for example, a node constituting the information processing system 90, software components, and the like. The log information which is output from such system constituent elements include a system log file which is output by the operating system of a node, a log file representing an access history or a processing history which is output by a web server application or a database server application, or the like.

Figure 2:
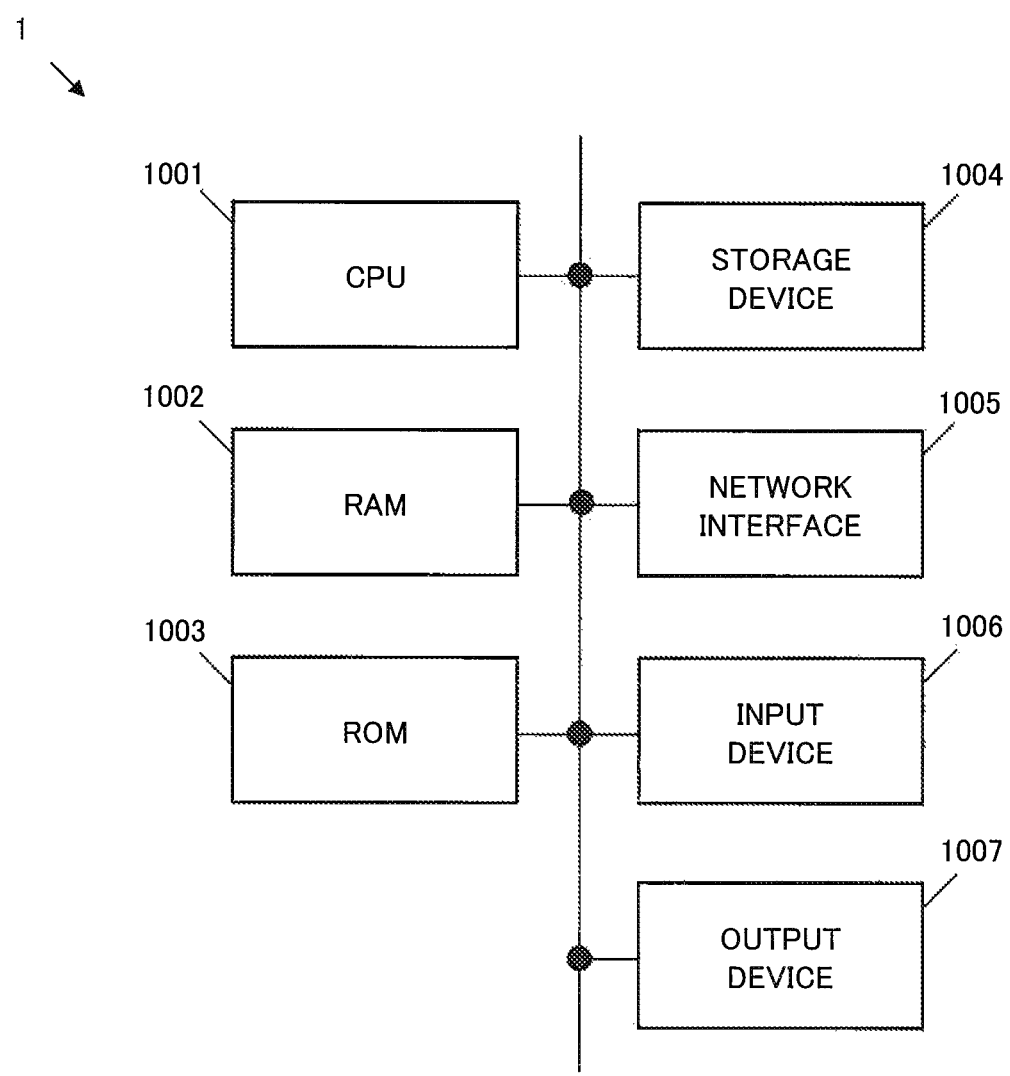
FIG. 2 is a hardware configuration diagram illustrating the fault analysis apparatus according to the first exemplary embodiment of the present invention.

As shown in FIG. 2, the fault analysis apparatus 1 can be constituted by a computer apparatus including a Central Processing Unit (CPU) 1001, a Random Access Memory (RAM) 1002, a Read Only Memory (ROM) 1003, a storage device 1004 such as a hard disk, a network interface 1005, an input device 1006, an output device 1007. In this case, the log element extraction unit 101 is constituted by the network interface 1005, the input device 1006, and the CPU 1001 that writes computer programs and various kinds of data stored in the ROM 1003 and the storage device 1004 to the RAM 1002 and executes the computer programs. The log combining unit 102, the pattern extraction unit 103, the pattern conversion unit 105, and the pattern comparison unit 106 are constituted by the CPU 1001 that writes computer programs and various kinds of data stored in the ROM 1003 and the storage device 1004 to the RAM 1002 and executes the computer programs. The pattern storage unit 104 is constituted by the storage device 1004. The cause portion presenting unit 107 is constituted by the output device 1007 and the CPU 1001 that writes computer programs and various kinds of data stored in the ROM 1003 and the storage device 1004 to the RAM 1002 and executes the computer programs. The fault analysis apparatus 1 and the hardware configuration of each functional block are not limited to the above configuration.

Subsequently, the details of each functional block of the fault analysis apparatus 1 will be explained.

The log element extraction unit 101 extracts an element constituting log information (log element) from one or more pieces of log information which are output by the information processing system 90. For example, the log element may be information indicating data included in a log record constituting the log information and information indicating a node name, an application name, and the like. The log element which is to be extracted may be defined in advance.

The log combining unit 102 attaches information about a related system constituent element (system constituent element information) to each log element extracted by the log element extraction unit 101. Then, the log combining unit 102 combines the log elements attached with the related system constituent element information and generates combined log information. For example, the log combining unit 102 may add, to each log element, information indicating the system constituent element that output the log information which is the source of extraction of the log element. For example, the log combining unit 102 may generate combined log information by arranging the log elements attached with the system constituent element information in the chronological order. In this case, the log combining unit 102 may combine the log elements in accordance with the date and time when associated with each log element in the log information of the source of the extraction.

The pattern extraction unit 103 extracts a pattern of information including system constituent element information from the combined log information generated by the log combining unit 102. Publicly-known pattern enumeration algorithms such as, e.g., apriori, prefixspan, and Linear time Closed itemset Miner (LCM) may be employed for extraction of a pattern.

The pattern storage unit 104 stores a pattern during a period in which a comparison is performed (which will be hereinafter referred to as comparison target pattern). The comparison target period may be a period in which it is known that, for example, the information processing system 90 is operating normally. More specifically, the pattern storage unit 104 stores, as a comparison target pattern, a pattern that is extracted by performing a series of processing with the log element extraction unit 101, the log combining unit 102, and the pattern extraction unit 103 on various kinds of log information which are output from the information processing system 90 during such comparison target period. The pattern storage unit 104 may store, as a comparison target pattern, those of patterns which are thus extracted and which satisfy a predetermined frequently occurring condition.

The pattern conversion unit 105 operates when a system constituent element information that is not included in the comparison target pattern is included in a pattern during which an analysis is performed (which will be hereinafter referred to as analysis target pattern). Hereinafter, a system constituent element information which is included in the analysis target pattern but is not included in the comparison target pattern will also be described as system constituent element information to be converted.

In this case, the analysis target period may be, for example, a period in which a fault occurred in the information processing system 90. The pattern conversion unit 105 obtains, as an analysis target pattern, a pattern that is extracted by performing a series of processing with the log element extraction unit 101, the log combining unit 102, and the pattern extraction unit 103 on various kinds of log information which are output from the information processing system 90 during such analysis target period.

More specifically, the pattern conversion unit 105 identifies a system constituent element information included in the comparison target pattern and similar to the system constituent element of the conversion target. Then, the pattern conversion unit 105 performs conversion between the system constituent element information of the conversion target and similar system constituent element information in any one of the comparison target pattern and the analysis target pattern.

For example, the pattern conversion unit 105 may adopt, as a comparison target pattern, a pattern that is made by converting "similar system constituent element information" in the comparison target pattern into "the system constituent element information of the conversion target". Alternatively, the pattern conversion unit 105 may adopt, as an analysis target pattern, information that is made by converting "the system constituent element information of the conversion target" in the analysis target pattern into "similar system constituent element information".

After the conversion processing with the pattern conversion unit 105, the pattern comparison unit 106 compares the analysis target pattern and the comparison target pattern and detects a difference. For example, the pattern comparison unit 106 searches those where the analysis target pattern and the comparison target pattern partially match each other after the conversion processing. The pattern comparison unit 106 may detect, as a difference, a non-matching portion of the analysis target pattern and the comparison target pattern which match each other partially.

The cause portion presenting unit 107 presents, as the portion of the cause of the fault, the system constituent element information indicating the difference detected by the pattern comparison unit 106.

The operation of the fault analysis apparatus 1 configured as described above will be explained with reference to FIGS. 3 and 4.

Figure 3:
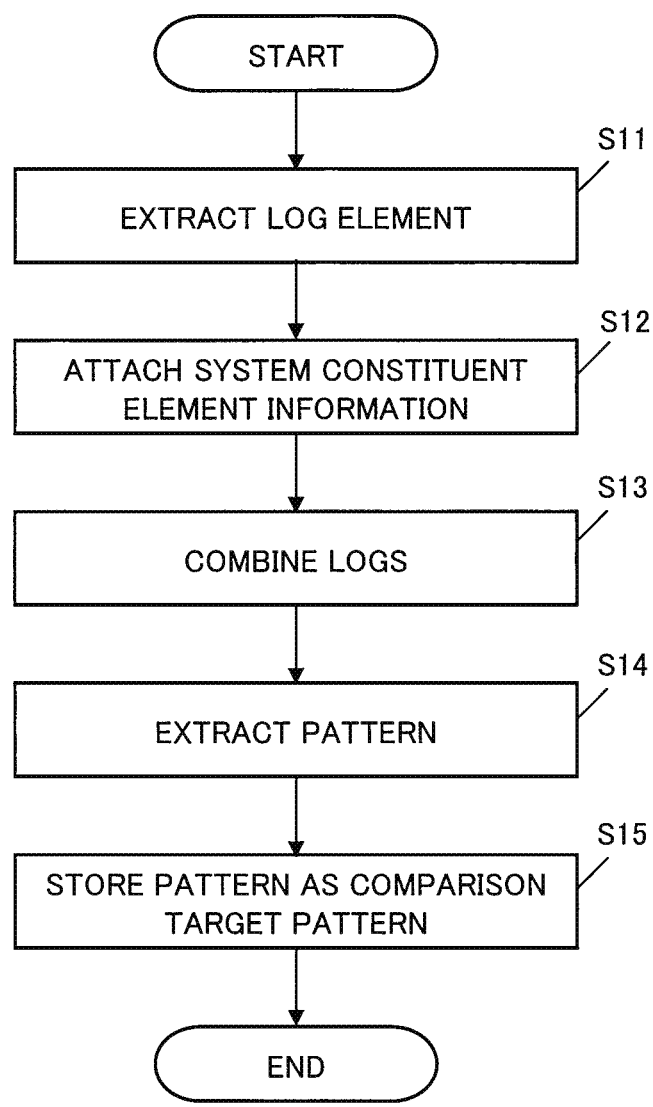
FIG. 3 is a flowchart for illustrating a pattern extraction operation in the fault analysis apparatus according to the first exemplary embodiment of the present invention.

First, an operation in which the fault analysis apparatus 1 extracts a comparison target pattern and stores the extracted comparison target pattern to the pattern storage unit 104 will be shown in FIG. 3. When the fault analysis apparatus 1 receives information for commanding start of generation of a comparison target pattern during a comparison target period from the input device 1006 or other functional blocks not shown, the fault analysis apparatus 1 may start the pattern extraction operation on the log information determined in advance. Alternatively, when the fault analysis apparatus 1 receives log information that is output in the comparison target period from another functional block, the fault analysis apparatus 1 may start the pattern extraction operation. Alternatively, the fault analysis apparatus 1 may start the pattern extraction operation when the fault analysis apparatus 1 detects an update of the log information determined in advance during the comparison target period. The fault analysis apparatus 1 may execute the pattern extraction operation on the range designated as the comparison target period in the target log information.

In FIG. 3, first, the log element extraction unit 101 extracts log elements from various kinds of target log information (step S11).

Subsequently, the log combining unit 102 attaches related system constituent element information to each log element extracted in step S11 (step S12).

Subsequently, the log combining unit 102 combines the log elements attached with the system constituent element information in step S12, and generates combined log information (step S13).

Subsequently, the pattern extraction unit 103 extracts a pattern of information including system constituent element information from the combined log information generated in step S13 (step S14).

Subsequently, the pattern storage unit 104 stores a pattern extracted in step S14 as a comparison target pattern (step S15).

Hereinabove, the fault analysis apparatus 1 terminates the extraction operation of the comparison target pattern.

Subsequently, an operation in which the fault analysis apparatus 1 analyzes a fault in an analysis target period will be shown in FIG. 4. When the fault analysis apparatus 1 receives information for commanding start of fault analysis from the input device 1006 or other functional blocks not shown, the fault analysis apparatus 1 may start the fault analysis operation on the log information determined in advance. Alternatively, when the fault analysis apparatus 1 receives log information that is output in the analysis target period from another functional block, the fault analysis apparatus 1 may start the fault analysis operation. Alternatively, the fault analysis apparatus 1 may start the fault analysis operation on the log information determined in advance when another functional block detecting a fault detects a fault. The fault analysis apparatus 1 may execute the fault analysis operation on the range designated as the analysis target period in the target log information.

Figure 4:
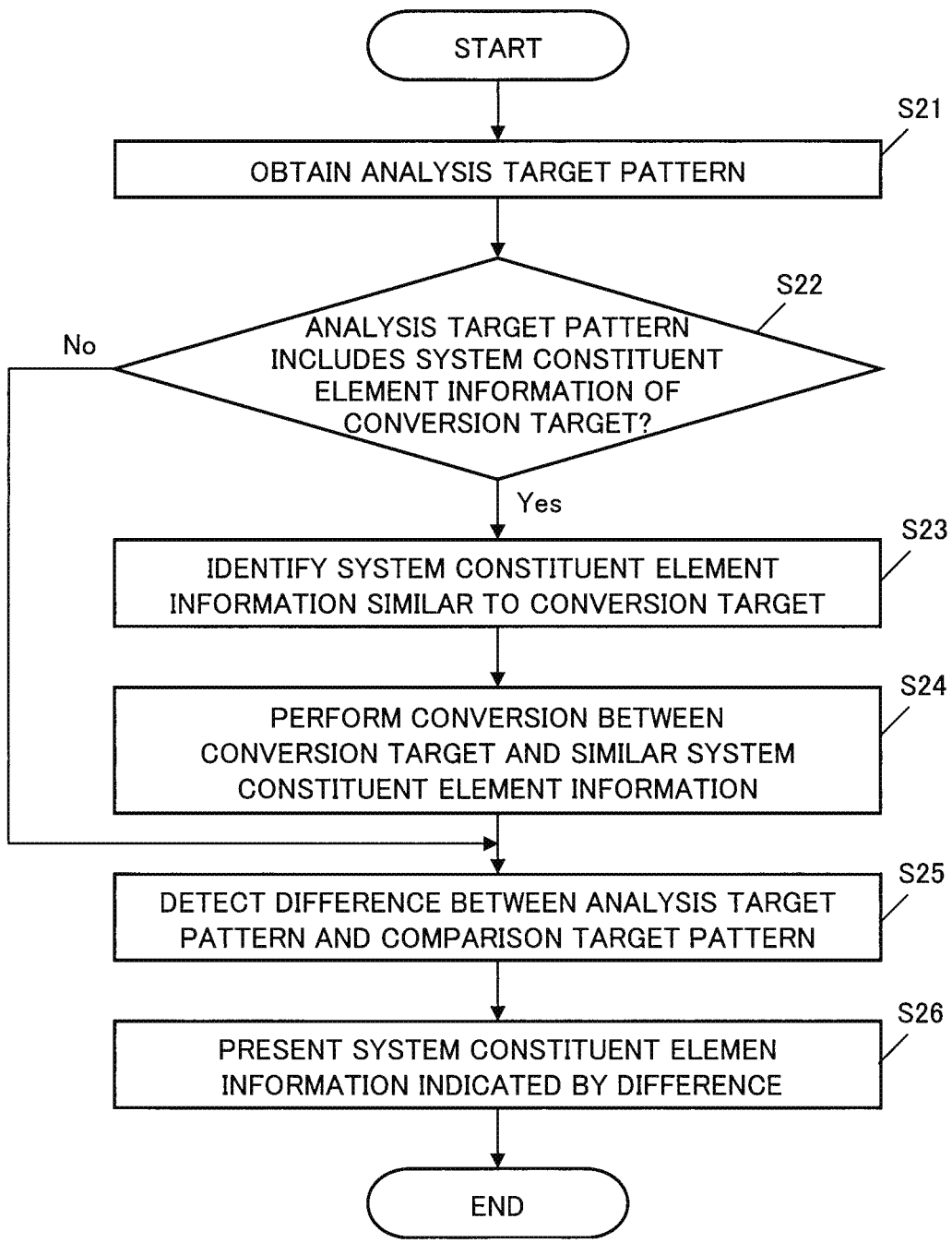
FIG. 4 is a flowchart for illustrating a fault analysis operation in the fault analysis apparatus according to the first exemplary embodiment of the present invention.

In FIG. 4, first, the fault analysis apparatus 1 obtains an analysis target pattern (step S21). More specifically, the log element extraction unit 101, the log combining unit 102, and the pattern extraction unit 103 may execute steps S11 to S14 shown in FIG. 3 on various kinds of log information which are output from the information processing system 90 in the analysis target period.

Subsequently, the pattern conversion unit 105 determines whether the analysis target pattern obtained in step S21 includes any system constituent element information that is not included in the comparison target pattern stored in the pattern storage unit 104 (step S22).

In this case, when the analysis target pattern is determined not to include any system constituent element information that is not included in the comparison target pattern, the operation of the fault analysis apparatus 1 proceeds to step S25.

On the other hand, when the analysis target pattern is determined to include any system constituent element information that is not included in the comparison target pattern, the pattern conversion unit 105 adopts the system constituent element information as the conversion target, and identifies a system constituent element information included in the comparison target pattern and similar to the conversion target (step S23).

Subsequently, the pattern conversion unit 105 performs conversion between the system constituent element information of the conversion target and the similar system constituent element information in any one of the analysis target pattern and the comparison target pattern (step S24).

Subsequently, pattern comparison unit 106 detects a difference by comparing the analysis target pattern and the comparison target pattern (step S25).

Subsequently, the cause portion presenting unit 107 presents the system constituent element information related to the difference detected in step S25 as the portion of the cause of the fault (step S26).

Hereinabove, the fault analysis apparatus 1 terminates the fault analysis operation.

Subsequently, the effects of the first exemplary embodiment of the present invention will be described.

The fault analysis apparatus according to the first exemplary embodiment of the present invention can more accurately present information that can identify the portion of the cause of the fault that has not occurred in the past even in the information processing system of which configuration changes.

This is because the log element extraction unit extracts log elements from various kinds of log information which are output from the information processing system during the comparison target period, and the log combining unit attaches related system constituent element information to the extracted log elements and generates combined log information. In addition, this is because the pattern extraction unit then extracts a comparison target pattern from the combined log information and stores the comparison target pattern to the pattern storage unit. Then, the log element extraction unit extracts log elements from various kinds of log information which are output from the information processing system during the analysis target period, and the log combining unit attaches related system constituent element information to the extracted log elements, and generates combined log information. Further, this is because the pattern extraction unit extracts an analysis target pattern from the combined log information. Then, when the analysis target pattern is determined to include a system constituent element information of conversion target that is not included in the comparison target pattern, the pattern conversion unit identifies a system constituent element information included in the comparison target pattern and similar to the conversion target. Further, this is because the pattern conversion unit performs conversion between the system constituent element of the conversion target and the similar system constituent element in any one of the comparison target pattern and the analysis target pattern. Further, this is because the pattern comparison unit detects a difference by comparing the analysis target pattern and the comparison target pattern after the conversion processing, and the cause portion presenting unit presents system constituent element information indicating the detected difference.

Accordingly, the fault analysis apparatus according to the first exemplary embodiment of the present invention can cope with a case where a fault that has not occurred in the past occurs after the configuration of the information processing system changes in the information processing system. This is because the pattern conversion unit performs the above conversion, which increases the chance of detecting a comparison target pattern partially matching the analysis target pattern during the occurrence of the fault even from the comparison target pattern accumulated before the change of the configuration. Then, in such case the fault analysis apparatus according to the first exemplary embodiment of the present invention can present, as the portion of the cause of the fault, the system constituent element information indicating the difference, i.e., the analysis target pattern does not match the partially matching comparison target pattern. As a result, even if the fault analysis apparatus according to the first exemplary embodiment of the present invention adopts, as the target, the complicated information processing system of which configuration frequently changes, the fault analysis apparatus according to the first exemplary embodiment of the present invention can output system constituent element information that is possibly the portion of the cause of the fault that has not occurred in the past.

Second Exemplary Embodiment

Subsequently, the second exemplary embodiment of the present invention will be explained in details with reference to drawings. In each drawing referred to in the explanation about the present exemplary embodiment, the same configuration as the first exemplary embodiment of the present invention and the steps operating in a similar manner thereto are denoted with the same reference numerals, and detailed explanation thereabout is omitted in the present exemplary embodiment.

Figure 5:
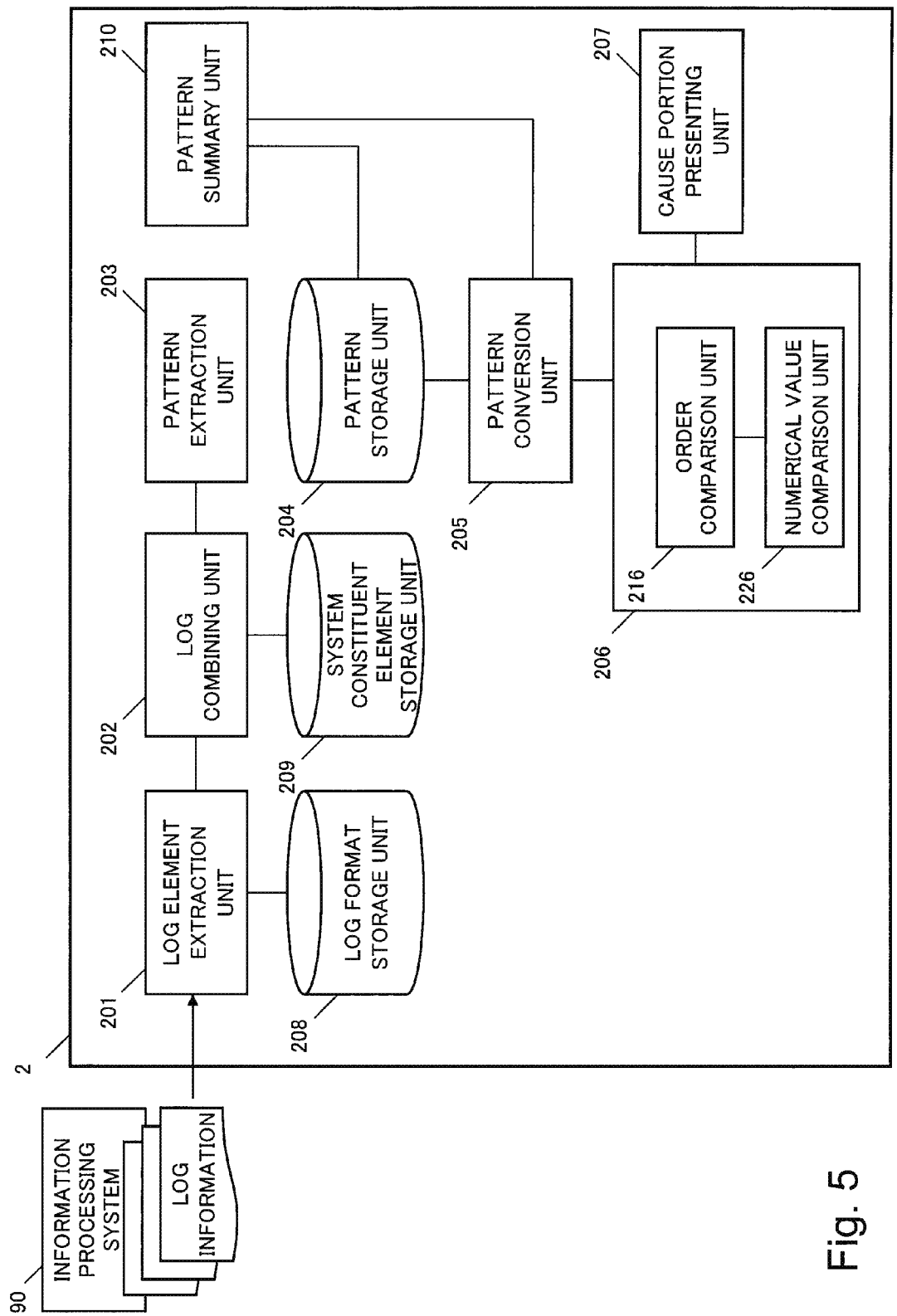
FIG. 5 is a functional block diagram illustrating functions of a fault analysis apparatus according to a second exemplary embodiment of the present invention.

First, a functional block diagram illustrating a functional configuration of a fault analysis apparatus 2 according to the second exemplary embodiment of the present invention will be shown in FIG. 5. In FIG. 5, the fault analysis apparatus 2 is different from the fault analysis apparatus 1 according to the first exemplary embodiment of the present invention in that the fault analysis apparatus 2 includes a log element extraction unit 201, a log combining unit 202, a pattern extraction unit 203, a pattern storage unit 204, a pattern conversion unit 205, a pattern comparison unit 206, and a cause portion presenting unit 207 instead of the log element extraction unit 101, the log combining unit 102, the pattern extraction unit 103, the pattern storage unit 104, the pattern conversion unit 105, the pattern comparison unit 106, and the cause portion presenting unit 107, and further includes a log format storage unit 208, a system constituent element storage unit 209, and a pattern summary unit 210. The pattern comparison unit 206 includes an order comparison unit 216 and a numerical value comparison unit 226. The pattern summary unit 210 constitutes a part of an exemplary embodiment of the pattern extraction unit, the pattern comparison unit, and the cause portion presenting unit of the present invention.

In this case, the fault analysis apparatus 2 can be constituted by the computer apparatus having the hardware configuration explained with reference to FIG. 2 like the fault analysis apparatus 1 according to the first exemplary embodiment of the present invention. In this case, the log format storage unit 208 and the system constituent element storage unit 209 are constituted by a storage device 1004. The pattern summary unit 210 is constituted by a CPU 1001 that writes computer programs and various kinds of data stored in a ROM 1003 and a storage device 1004 to a RAM 1002 and executes the computer programs. The hardware configuration of the fault analysis apparatus 2 and the functional blocks thereof are not limited to the above configuration.

Like the fault analysis apparatus 1 according to the first exemplary embodiment of the present invention, the fault analysis apparatus 2 is configured to be able to collect various kinds of log information which are output from an information processing system 90. The log information may be, for example, output as a log file with software components and nodes serving as system constituent elements of the information processing system 90 and the like. Examples of log information collected by the fault analysis apparatus 2 will be shown in FIG. 6. In FIG. 6, for example, "mysqld-.log" is a log file having one or more log records constituted by log elements, i.e., "date", "time", and "message main text". On the other hand, "access.log" is a log file having one or more log records constituted by log elements, i.e., "network address", "date time", and "message main text".

The log format storage unit 208 stores a format of information included in the log information. Hereinafter, a format of information included in the log information will be also denoted as a log format. The log format may be a log format including, for example, information expressing a log type and a format information made up with a combination of a log element and a regular expression thereof. An example of such log format will be shown in FIG. 7. In FIG. 7, for example, the format information of the log type "syslog" in the first line is expressed as a set of regular expressions respectively corresponding to log element, i.e., "date and time", "node name", "process name", and "message". The log format may further include information indicating the name of the log file in question.

The system constituent element storage unit 209 stores related system constituent element information in association with related information about the log information. The related information about the log information may be, for example, the path name of the log information in the storage device 1004. Alternatively, the related information about the log information is information such as a regular expression that can identify a log record and a log element included in the log information.

An example of information stored in the system constituent element storage unit 209 will be shown in FIG. 8. In FIG. 8, each line indicates system constituent element information. In this example, the system constituent element information is associated with a path name serving as related information about log information. The system constituent element information includes "identification information". The system constituent element information includes information indicating attributes such as "constituent element name", "classification 1", "classification 2", and "location". For example, in this example, the "constituent element name" is the name of a node and a software component. The "classification 1" is information indicating a classification of a corresponding system constituent element such as an application, middleware, or hardware. The "classification 2" is an item that is obtained by further subdividing the "classification 1". For example, when the "classification 1" is a server, an example of the "classification 2" include a web server, an application server, a database server, or the like. When the "classification 1" is an application, examples of the "classification 2" include Apache, MySQL, and the like. The "location" is information indicating a location to which the system constituent element in question belongs in the information processing system 90. For example, the "location" of the system constituent element of which "classification 1" is a server may be a network address. The "location" of the system constituent element of which "classification 1" is an application may be the name of the node in which the application is installed. Hereinafter, system constituent element information of which identification information is "N" will also be denoted as a system constituent element "N".

The log element extraction unit 201 extracts a log element from log information by referring to a log format stored in the log format storage unit 208. For example, the log element extraction unit 201 extracts, from the log information, log elements such as a time when the log record occurred, an output node, a classification of the output node, an output process, a process ID of the output process, an event ID, a network address, a log file name, a message, and the like.

More specifically, the log element extraction unit 201 reads at least a portion of the target log information. Then, the log element extraction unit 201 searches a log format that matches the read information from the log format storage unit 208, so that the log element extraction unit 201 determines the log type of the log information. Then, the log element extraction unit 201 may extract a log element in accordance with the determined log type.

For example, when a log file "message" as shown in FIG. 6 is read out, the log element extraction unit 201 determines that it matches the log format in the first line of FIG. 7, thus determining the log type "syslog". Then, the log element extraction unit 201 may extract log elements by referring to the format information of the matching log format on the basis of the determined log type.

At this occasion, the log element extraction unit 201 may not extract all the log elements constituting the matching format information, and may extract those of the log elements that have been configured in advance. In this case, the log element that is set as the extraction target is preferably capable of identifying the system constituent elements from the extracted log element or a combination thereof on the basis of the information stored in the system constituent element storage unit 209. The log element which is to be extracted may be set for each log type.

For example, the log elements which are to be extracted with regard to the log type "syslog" is assumed to be "date and time" and "node name". In this case, once the log element extraction unit 201 reads the first line of the log information "message" as shown in FIG. 6, the log element extraction unit 201 extracts "Feb 01 09:04:01" corresponding to "date and time" and "node1" corresponding to "node name" from the log elements "date and time", "node name", "process name", and "message" included in the format information of "syslog".

For each log element extracted by the log element extraction unit 201, the log combining unit 202 identifies the related system constituent element information by referring to the system constituent element storage unit 209 on the basis of the related information about the log information from which the log element is extracted. Then, the log combining unit 202 attaches at least identification information of the related system constituent element information to each log element, and combines the log elements by arranging the log elements in the chronological order. More specifically, the log combining unit 202 may combine the log elements in accordance with the date and time associated with the log elements in the log information from which the log elements are extracted. If information indicating the date and time is extracted as a log element, the log combining unit 202 may combine the log elements on the basis of the log element indicating the date and time. The log combining unit 202 may add not only the identification information about the related system constituent element information but also the attribute information to each log element.

For example, the log elements of the date and time "Feb 01 09:04:01" and the node name "node1" are assumed to be extracted from the log information "message" as shown in FIG. 6. In this case, the log combining unit 202 refers to the information about the system constituent element storage unit 209 as shown in FIG. 8, and identifies the related constituent element "A" on the basis of a combination of the path name "/var/log/message" of the log information from which the log elements are extracted and "node1" which is one of the extracted log elements. Accordingly, the log combining unit 202 may add the identification information "A" and the attribute information thereof to these log elements (date and time "Feb 01 09:04:01" and node name "node1").

An example of combined log information which is output by the log combining unit 202 will be shown in FIG. 9. In FIG. 9, each line indicates a log element and attached system constituent element information, and the lines are arranged in the chronological order. In this example, the log element extraction unit 201 extracts a log element indicating the date and time at which the log record is recorded. In this example, identification information for identifying the system constituent element and the attribute information thereof are attached to the log element indicating the date and time. More specifically, for example, the log combining unit 202 refers to the information about the system constituent element storage unit 209 of FIG. 8, and the log combining unit 202 identifies, with regard to the log element "2013/02/01 09:04:01" in the first line of FIG. 9, the system constituent element "V" related to the path name "/var/log/httpd/access_log" of the log information from which the log element is extracted. Then, the log combining unit 202 attaches at least the identification information "V" to the log element in the first line. Further, the log combining unit 202 attaches attribute information "node1, Application, apache" for the system constituent element "V" to this log element. In this case, the log combining unit 202 determines, from FIG. 8, that "node1" in the attached attribute information is the system constituent element having the attribute information. Accordingly, the log combining unit 202 may further attach the attribute information "Server, Web server" of the system constituent element "node1" to the log element in the first line. As described above, when the attribute information attached to the log element further includes another system constituent element having attribute information, the log combining unit 202 may recursively attach the attribute information.

The pattern extraction unit 203 extracts a pattern of identification information of a system constituent element from the combined log information generated by the log combining unit 202. More specifically, the pattern extraction unit 203 extracts the identification information while the order included in the combined log information is maintained. The pattern extraction unit 203 may summarize attached different identification information attached together with attribute information similar to each other, and convert it into new identification information, and then, a pattern of the identification information may be extracted.

In the case of the combined log information as shown in FIG. 9, the pattern extraction unit 203 extracts a list "VVW-WWX" of identification information. Then, the pattern extraction unit 203 enumerates patterns that can be extracted from the list of the identification information. In this case, publicly-known pattern enumeration algorithms such as, e.g., apriori, prefixspan, and LCM may be employed for enumeration of a pattern.

The pattern extraction unit 203 may also select a pattern that satisfies a predetermined condition from among patterns that can be extracted from the list of the identification information. For example, the predetermined condition may be a condition based on the number of times the pattern appears, a ratio of the number of times the pattern appears with respect to the total number of patterns, the number of pieces of identification information constituting the pattern, or statistical value such as an average value of these values, a maximum value, a minimum value, a mode value, or dispersion. Such predetermined condition may be set in advance. For example, when a ratio of a pattern further including other identification information "B" with respect to a pattern including identification information "A" is more than 0.5, the pattern extraction unit 203 may select a pattern including both of the identification information "A" and "B". For example, in a case of the combined log information as shown in FIG. 9, the pattern extraction unit 203 may extract patterns "VVWW" and "WWX".

The pattern summary unit 210 calculates a relative ratio of the number of times the identification information about the system constituent element included in the extracted pattern appears. For example, the pattern extraction unit 203 is assumed to extract a pattern "VVWWWX" of the identification information. In this case, the number of times the identification information "V" included in this pattern appears is 2, the number of times "W" appears is 3, and the number of times "X" appears is 1. Accordingly, the pattern summary unit 210 calculates the relative ratio of the number of times this pattern appears to derive 2:3:1. Hereinafter, when the identification information "X", "Y", "Z" are included in the pattern, and the relative ratio of the number of times each of them appears is x:y:z, this pattern is denoted as "X(x)Y(y)Z(z)". In the case of the above example, the pattern "VVWWWX" is also denoted as "V(2)W(3)X(1)".

The pattern summary unit 210 may summarize the pattern and calculate the ratio of appearance of each of them. The ratio of appearance is a ratio of the number of times any given pattern appears with respect to the total number of times a pattern including the pattern appears. For example, a pattern "A(1)F(1)G(3)L(2)H(1)" as compared with a pattern "A(1)F(1)G(3)" is a pattern including the same pattern. At this occasion, the number of times the pattern "A(1)F(1)G(3)" appears is assumed to be eight times, and the total number of times the pattern including this pattern (for example, "A(1)F(1)G(3)L(2)H(1)" explained above and the like) appears is assumed to be ten times. In this case, the ratio of appearance of the pattern "A(1)F(1)G(3)" is calculated as 0.8. When there is not any other pattern including the same pattern as any given pattern, the total number of times the a pattern including the pattern in question appears is equal to the number of times the pattern in question itself appears. Therefore, the ratio of appearance of such pattern is calculated as one.

As described above, an example of a pattern summarized by the pattern summary unit 210 will be shown in FIG. 10. In FIG. 10, in each pattern, an identification number is attached for the sake of explanation. Hereinafter, a pattern of which identification number is n will also denoted as a pattern n. In this example, the pattern 1 is constituted by identification information "A", "F", "G" and "K", and the relative ratio is 1:1:3:1, and the ratio of appearance is 0.8.

The pattern storage unit 204 stores comparison target patterns and summary information summarized by the pattern summary unit 210 with regard to the comparison target patterns.

When the analysis target pattern includes identification information of a system constituent element that is not included in the comparison target pattern, the pattern conversion unit 205 operates with the identification information about the system constituent element being the conversion target. More specifically, the pattern conversion unit 205 searches a system constituent element having attribute information satisfying a predetermined similar condition from attribute information possessed by the system constituent element indicating the identification information of the conversion target by referring to the system constituent element storage unit 209. Then, the pattern conversion unit 205 identifies, as identification information about the system constituent element similar to the conversion target, identification information about the system constituent element having the attribute information satisfying such predetermined similar condition and included in the comparison target pattern. For example, an example of the predetermined similar condition includes a condition that the attribute values except "location" are the same. Alternatively, the predetermined similar condition may other conditions based on attribute information and a combination thereof.

Then, the pattern conversion unit 205 performs conversion between the identification information about the system constituent element of the conversion target and the identification information about the system constituent element similar to the conversion target in any one of the comparison target pattern and the analysis target pattern. Like the pattern conversion unit 105 in the first exemplary embodiment of the present invention, the pattern conversion unit 205 may perform the conversion in the comparison target pattern, and may perform the conversion in the analysis target pattern. More specifically, the pattern conversion unit 205 may convert the identification information of the similar system constituent element in the comparison target pattern to the identification information of the system constituent element of the conversion target. The pattern conversion unit 205 may convert the identification information of the system constituent element of the conversion target in the analysis target pattern to the identification information of the similar system constituent element.

For example, a case where the analysis target pattern is "AFGL", and the identification information "L" is included in any of the comparison target patterns will be explained. In this case, this identification information "L" is the conversion target. In this case, the system constituent element "K" with respect to the system constituent element "L" of the conversion target matches the attribute value other than "location" by referring to the information stored in the system constituent element storage unit 209 as shown in FIG. 8. In this case, the identification information "K" is assumed to be included in the comparison target pattern. Therefore, the pattern conversion unit 205 identifies the system constituent element "K" similar to the system constituent element "L" of the conversion target. Accordingly, the pattern conversion unit 205 converts "K" into "L" in all the comparison target patterns including the identification information "K" in the pattern storage unit 204. For example, the comparison target pattern "AFGK" is converted into "AFGL". Alternatively, the pattern conversion unit 205 may convert the identification information "L" of the conversion target into similar "K" in the analysis target pattern. For example, the pattern conversion unit 205 may convert the analysis target pattern "AFGL" into "AFGK".

If there are multiple similar system constituent elements with respect to the conversion target, the pattern conversion unit 205 may perform the conversion between the identification information of the conversion target and each pieces of multiple similar identification information. More specifically, in the above example, the system constituent elements "K" and "J" similar to the system constituent element "L" of the conversion target are assumed to be identified. In this case, in the pattern storage unit 204, the pattern conversion unit 205 may convert "K" of each comparison target pattern including the into "L", and may convert "J" of each comparison target pattern including the identification information "J" into "L". For example, the comparison target pattern "AFGK" is converted into "AFGL", and "AFGJ" is converted into "AFGL". Alternatively, the pattern conversion unit 205 may generate a pattern obtained by converting the identification information "L" of the conversion target in the analysis target pattern into the similar identification information "K" and a pattern obtained by converting the identification information "L" of the conversion target in the analysis target pattern into the similar identification information "J". More specifically, the pattern conversion unit 205 may convert the analysis target pattern "AFGL" into "AFGK" and "AFGJ".

The pattern comparison unit 206 uses the order comparison unit 216 to compare, in the analysis target pattern and the comparison target pattern after the conversion processing, the order of the identification information about the system constituent elements constituting each of them, thus detecting the difference. The pattern comparison unit 206 uses the numerical value comparison unit 226 to compare, in the analysis target pattern and the comparison target pattern after the conversion processing, the relative ratio of the identification information about the system constituent elements constituting each of them, thus detecting the difference.

More specifically, when there is a comparison target pattern of which order of identification information about the system constituent elements completely match the analysis target pattern, the order comparison unit 216 outputs the corresponding analysis target pattern and the corresponding comparison target pattern to the numerical value comparison unit 226 explained later.

When there is a comparison target pattern of which order of the system constituent element information partially match the analysis target pattern, the order comparison unit 216 output the identification information of the portion where the order does not match in the corresponding analysis target pattern and the corresponding comparison target pattern to the cause portion presenting unit 207.

For example, without considering the relative ratio of the system constituent elements included in each of the analysis target pattern and the comparison target pattern, the order comparison unit 216 may compare the order of appearance thereof. More specifically, without considering the relative ratio of the analysis target pattern "A(1)F(2)G(1)K(3)" and the comparison target pattern "A(1)F(2)G(3)K(3)", the order comparison unit 216 may determine that the order are completely the same, and may output it to the numerical value comparison unit 226. Without considering the relative ratio of the analysis target pattern "A(1)F(2)G(1)K(3)" and the comparison target pattern "A(1)F(3)X(2)K(3)G(3)", the order comparison unit 216 may determine that "AF", which is the part of the order, is the same. Then, the order comparison unit 216 detects that the non-matching portion in the analysis target pattern is "GK" and the non-matching portion in the comparison target pattern is "XKG". Accordingly, the order comparison unit 216 outputs "G", "K", "X" as the identification information in the portion where there is a difference to the cause portion presenting unit 207.

If the order comparison unit 216 cannot search the comparison target pattern at least partially matching the analysis target pattern from the pattern storage unit 204, the order comparison unit 216 may output the analysis target pattern as the pattern that newly occurred to the cause portion presenting unit 207.

The numerical value comparison unit 226 compares the relative ratios of those of which order of identification information completely matches between the analysis target pattern and the comparison target pattern. Then, the numerical value comparison unit 226 outputs the identification information of which relative ratios do not match to the cause portion presenting unit 207.

For example, the numerical value comparison unit 226 determines that the relative ratios are the same between the analysis target pattern "A(1)F(2)G(1)K(3)" and the comparison target pattern "A(1)F(2)G(1)K(3)". The numerical value comparison unit 226 detects the identification information "G" of which relative ratio does not match in the analysis target pattern "A(1)F(2)G(1)K(3)" and the comparison target pattern "A(1)F(2)G(3)K(3)", and outputs the identification information "G" to the cause portion presenting unit 207.

The cause portion presenting unit 207 presents the related system constituent element information as information representing the portion of the cause of the fault on the basis of the identification information which is input from the order comparison unit 216 or the numerical value comparison unit 226. At this occasion, the cause portion presenting unit 207 may present the corresponding system constituent element information in the order of the ratio of appearance of the analysis target patterns or the ratio of appearance of the comparison target patterns in which the system constituent element information is detected. The cause portion presenting unit 207 may further present another related system constituent element information on the basis of the attribute information about the system constituent element indicated by the corresponding identification information.

For example, in the above example, the identification information "G" "K" "X" is assumed to be input from the order comparison unit 216. In this case, the cause portion presenting unit 207 refers to the information about the system constituent element storage unit 209 as shown in FIG. 8, thereby obtaining the system constituent element information indicated by each of the identification information "G" "K" "X". Then, the cause portion presenting unit 207 presents, as the portion of the cause that may be the fault, "Application_Z" of "Node 1" on the basis of the identification information "G", "Application_X" of "Node 2" on the basis of the identification information "K", and "Application_Y" of "Node 1" on the basis of the identification information "X". As described above, as the system constituent element information related to the detected difference, the cause portion presenting unit 207 outputs system constituent elements such as nodes, applications, and processes constituting the information processing system 90 and the attribute values thereof to the output device 1007, the storage device 1004, and the like as the portion of the cause.

When the identification information is input neither from the order comparison unit 216 nor the numerical value comparison unit 226, the cause portion presenting unit 207 may present that the fault is not detected from the log information in the analysis target period.

An operation of the fault analysis apparatus 2 configured as described above will be explained with reference to FIGS. 11 and 12.

Figure 11:
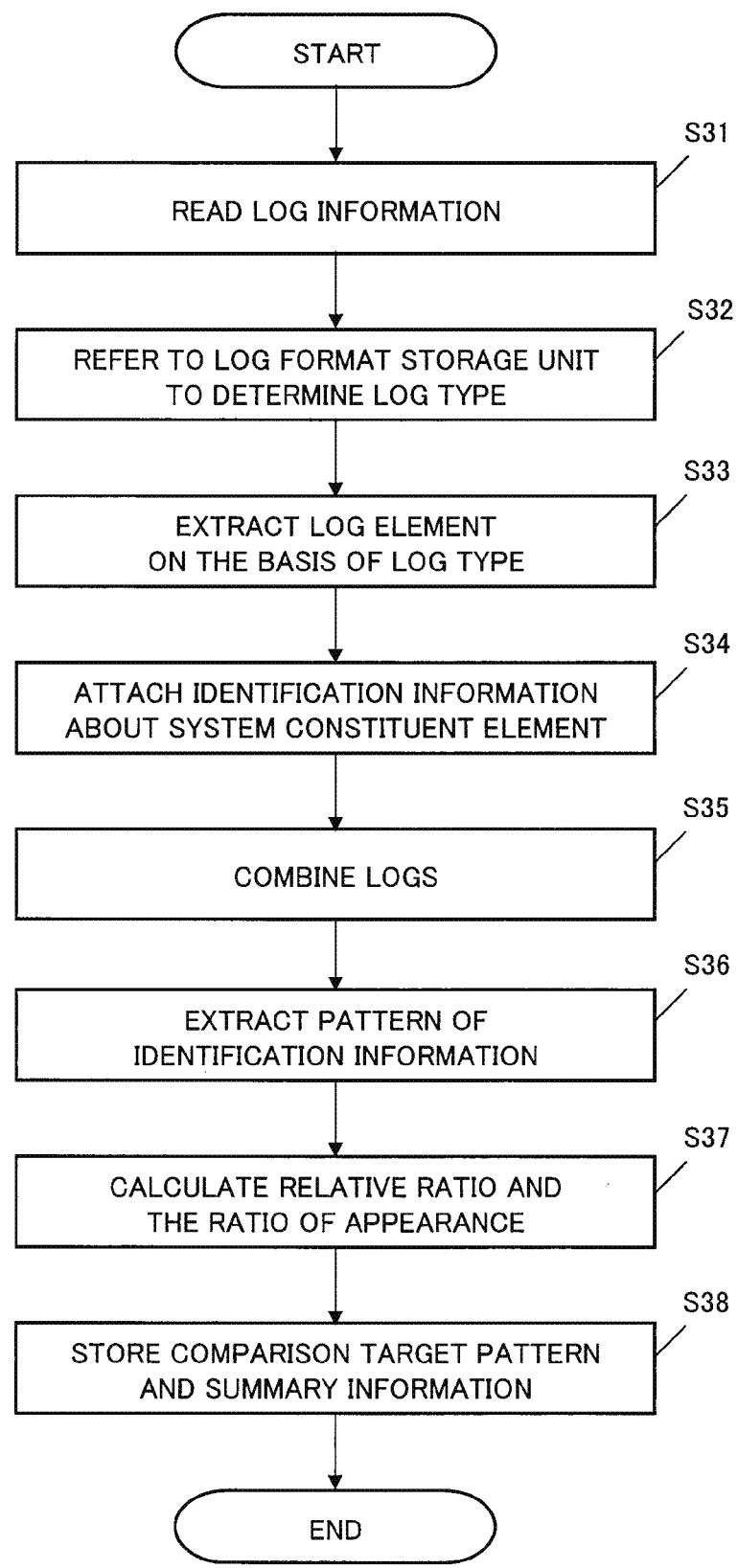
FIG. 11 is a flowchart for illustrating a pattern extraction operation in the fault analysis apparatus according to the second exemplary embodiment of the present invention.

First, an operation in which the fault analysis apparatus 2 extracts a comparison target pattern and stores the comparison target pattern to the pattern storage unit 204 will be shown in FIG. 11. When the fault analysis apparatus 2 receives information commanding start of generation of a comparison target pattern during a comparison target period from the input device 1006 or another functional block, not shown, the fault analysis apparatus 2 may start the pattern extraction operation on the log information that is defined as the target in advance. Alternatively, when the fault analysis apparatus 2 receives log information which is output in the comparison target period from another functional block, the fault analysis apparatus 2 may start the pattern extraction operation. Still alternatively, when the fault analysis apparatus 2 detects update of the log information defined as the target in advance in the comparison target period, the fault analysis apparatus 2 may start the pattern extraction operation. The fault analysis apparatus 2 may execute the pattern extraction operation on the range designated as the comparison target period in the target log information.

In FIG. 11, first, the log element extraction unit 201 reads various kinds of log information which are output from the information processing system 90 (step S31). The log element extraction unit 201 may read a part of each log information (for example, one line or multiple line) and repeat subsequent processing, or may read all of the log information at a time.

Subsequently, the log element extraction unit 201 searches the log format storage unit 208 to find the format matching the log information that has been read in step S31, thus determining the type of the log information (step S32). For example, when the log element extraction unit 201 reads information from the log file "message" as shown in FIG. 6, this is determined to match the format in the first line of the information of the log format storage unit 208 as shown in FIG. 7, and thus, the log type of the read log information is determined to be "syslog".

Subsequently, the log element extraction unit 201 extracts log elements on the basis of the log type determined in step S32 (step S33). For example, the log element extraction unit 201 may extract log elements which are defined to be extracted with regard to the determined log type.

Subsequently, the log combining unit 202 attaches, to each log element extracted in step S33, at least the identification information about the system constituent element related to the log element (step S34). At this occasion, as described above, the log combining unit 202 may further attach the attribute information about the related system constituent elements to each log element.

Subsequently, the log combining unit 202 combines the log elements attached with at least the identification information about the system constituent elements in step S34, and generates the combined log information (step S35).

Subsequently, the pattern extraction unit 203 extracts a pattern of the identification information about the system constituent elements from the combined log information generated in step S35 (step S36). At this occasion, as described above, the pattern extraction unit 203 may summarize attached different identification information attached together with attribute information similar to each other, and convert it into new identification information, and then, a pattern of the identification information may be extracted.

Subsequently, the pattern summary unit 210 calculates the relative ratio of the identification information included in the pattern extracted in step S36 and the ratio of appearance of the pattern (step S37).

Subsequently, the pattern storage unit 204 adopts the pattern extracted in step S36 as the comparison target pattern, and stores it with the summary information indicating the relative ratio and the ratio of appearance calculated in step S37 (step S38).

Hereinabove, fault analysis apparatus 2 terminates the extraction operation of the comparison target pattern.

Figure 12:
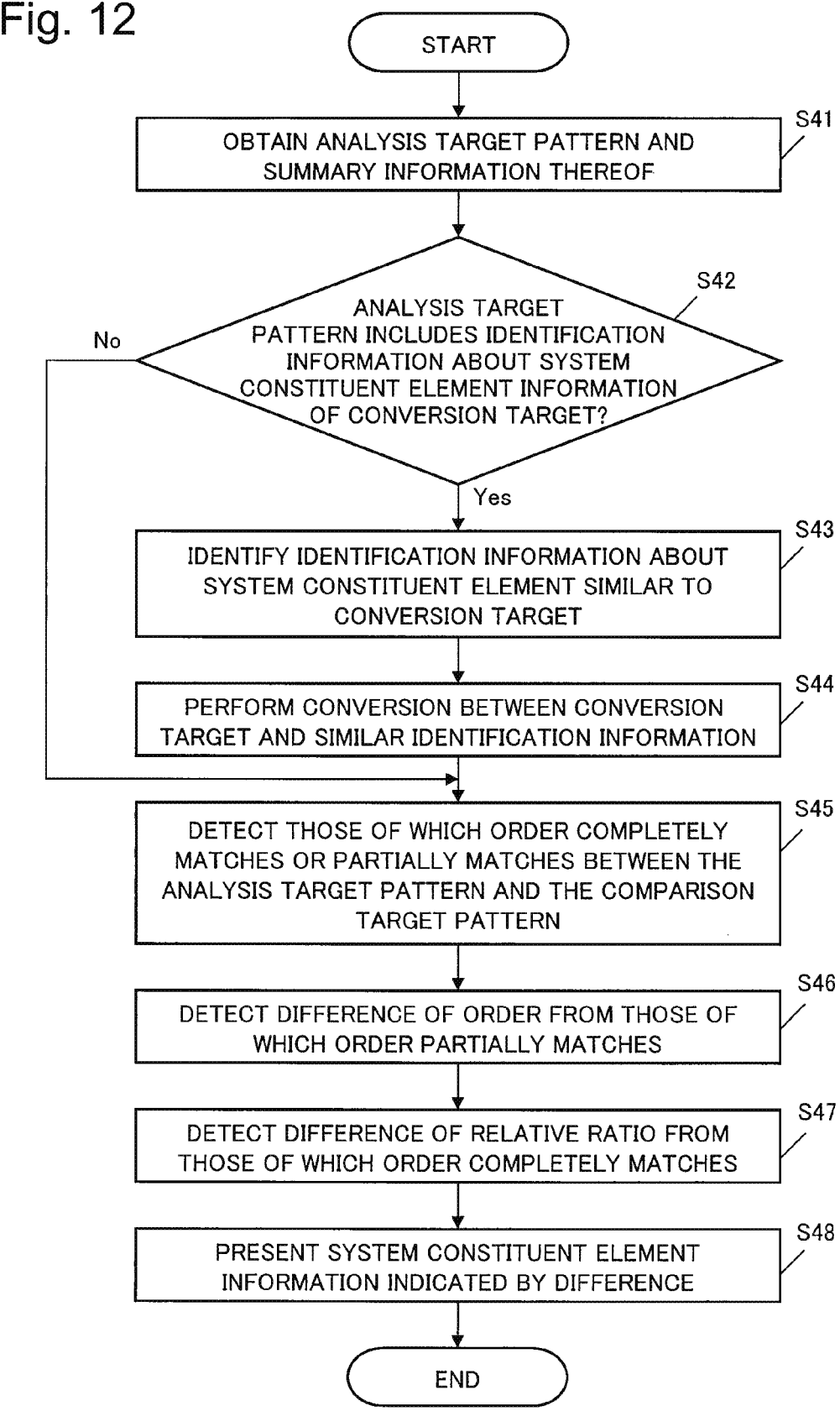
FIG. 12 is a flowchart for illustrating a fault analysis operation in the fault analysis apparatus according to the second exemplary embodiment of the present invention.

Subsequently, an operation in which the fault analysis apparatus 2 analyzes the fault of the analysis target period will be shown in FIG. 12. When the fault analysis apparatus 2 receives information commanding the start of the fault analysis from the input device 1006 or another functional block, not shown, the fault analysis apparatus 2 may start the fault analysis operation on the log information defined as the target in advance. Alternatively, when the fault analysis apparatus 2 receives log information that is output in the analysis target period from another functional block, the fault analysis apparatus 2 may start the fault analysis operation. Alternatively, the fault analysis apparatus 2 may start the fault analysis operation on the log information determined in advance when another functional block detecting a fault detects a fault. The fault analysis apparatus 2 may execute the fault analysis operation on the range designated as the analysis target period in the target log information.

First, the fault analysis apparatus 2 obtains the analysis target pattern and the summary information thereof (step S41). More specifically, the log element extraction unit 201, the log combining unit 202, the pattern extraction unit 203, and the pattern summary unit 210 executes steps S31 to S37 shown in FIG. 11 on various kinds of log information that are output from the information processing system 90 during the analysis target period.

Subsequently, the pattern conversion unit 205 determines whether the analysis target pattern includes identification information about the system constituent element that is not included in the comparison target pattern (step S42).

In this case, when the analysis target pattern is determined not to include the identification information that is not included in the comparison target pattern, the operation of the fault analysis apparatus 2 proceeds to step S45.

On the other hand, when the analysis target pattern is determined to include the identification information that is not included in the comparison target pattern, the pattern conversion unit 205 adopts the identification information as the conversion target, and identifies the identification information about the system constituent element similar to the conversion target included in the pattern stored in the pattern storage unit 204 (step S43). More specifically, the pattern comparison unit 206 identifies, as similar identification information, the identification information about the system constituent elements having the attribute information satisfying a predetermined similar condition from attribute information possessed by the system constituent element indicating the identification information of the conversion target.

Subsequently, the pattern conversion unit 205 performs conversion between the identification information of the conversion target and the similar identification information in any one of the analysis target pattern and the comparison target pattern (step S44).

Subsequently, the order comparison unit 216 detects a comparison target pattern of which order of identification information completely match the analysis target pattern and a comparison target pattern of which order of identification information partially match the analysis target pattern (step S45).

Subsequently, the order comparison unit 216 detects identification information of which order does not match between the comparison target pattern and the analysis target pattern of which orders detected in step S45 partially match each other (step S46).

Subsequently, the numerical value comparison unit 226 detects identification information of which relative ratio does not match between the comparison target pattern and the analysis target pattern of which order detected in step S45 completely match each other (step S47).

Subsequently, the cause portion presenting unit 207 presents, as the portion of the cause of the fault, information related to the system constituent elements indicated by the identification information detected in step S46 or S47 (step S48). For example, as described above, the cause portion presenting unit 207 may present various kinds of attribute values such as a name, a location of the system constituent element indicated by the detected identification information, and attribute value of another system constituent element indicated by the attribute value in question.

Hereinabove, the fault analysis apparatus 2 terminates the operation.

Subsequently, the effects of the second exemplary embodiment of the present invention will be described.

The fault analysis apparatus 2 according to the second exemplary embodiment of the present invention can present information capable of accurately identifying the portion of the cause of the fault that has not occurred in the past in an information processing system of which configuration changes.

This is because the log element extraction unit extracts a log element capable of identifying a related system constituent element on the basis of a format stored in the log format storage unit. This is because the log combining unit identifies related system constituent elements by referring to the system constituent element storage unit to attach at least the identification information thereof to the extracted log element, and generates combined log information. Further, this is because the pattern extraction unit extracts a pattern of the identification information about the system constituent elements included in the combined log information, and the pattern summary unit calculates a relative ratio of the identification information included in the pattern.

Then, when the analysis target pattern includes the identification information about the system constituent element that is not included in the comparison target pattern, the pattern conversion unit refers to the system constituent element storage unit. This is because, accordingly, such identification information is adopted as the conversion target, and the identification information about the system constituent element similar to the system constituent element indicated by the identification information of the conversion target is identified, and the conversion is performed between the identification information of the conversion target and the similar identification information.

This is because, then, the order comparison unit detects, as a difference, the identification information of which order does not match between the analysis target pattern and the comparison target pattern in which the order of the identification information partially matches each other. This is because the numerical value comparison unit detects, as a difference, the identification information of which relative ratio does not match each other between the analysis target pattern and the comparison target pattern of which order of the identification information completely matches each other. This is because the cause portion presenting unit then presents, as the portion of the cause of the fault, information related to the system constituent element indicated by the identification information detected as the difference.

As described above, the fault analysis apparatus according to the present exemplary embodiment performs the conversion between the identification information of the conversion target included in the analysis target pattern and the identification information similar to the conversion target included in the comparison target pattern. Accordingly, the fault analysis apparatus according to the present exemplary embodiment does not need to add or change the comparison target pattern every time the configuration of the information processing system changes, and the fault analysis apparatus according to the present exemplary embodiment increases the chance of detecting a comparison target pattern of which order of the identification information matches partially or completely the analysis target pattern. Therefore, the fault analysis apparatus according to the present exemplary embodiment can accurately detect the difference between the analysis target pattern and the comparison target pattern of which order of the identification information partially or completely matches each other. As a result, the fault analysis apparatus according to the present exemplary embodiment can present, as information capable of identifying the portion of the cause of the fault, information related to the system constituent element indicated by the detected difference.

In addition, the fault analysis apparatus according to the present exemplary embodiment detects identification information of which relative ratio does not match each other between the analysis target pattern and the comparison target pattern of which order of the identification information completely matches each other. Therefore, the fault analysis apparatus according to the present exemplary embodiment can present information capable of identifying the portion of the cause thereof even for a fault with which a normal message is output but of which number of outputs thereof is considered to be abnormal.

Third Exemplary Embodiment

Subsequently, the third exemplary embodiment of the present invention will be explained in details with reference to drawings. In each drawing referred to in the explanation about the present exemplary embodiment, the same configuration as the second exemplary embodiment of the present invention and the steps operating in a similar manner thereto are denoted with the same reference numerals, and detailed explanation thereabout is omitted in the present exemplary embodiment.

Figure 13:
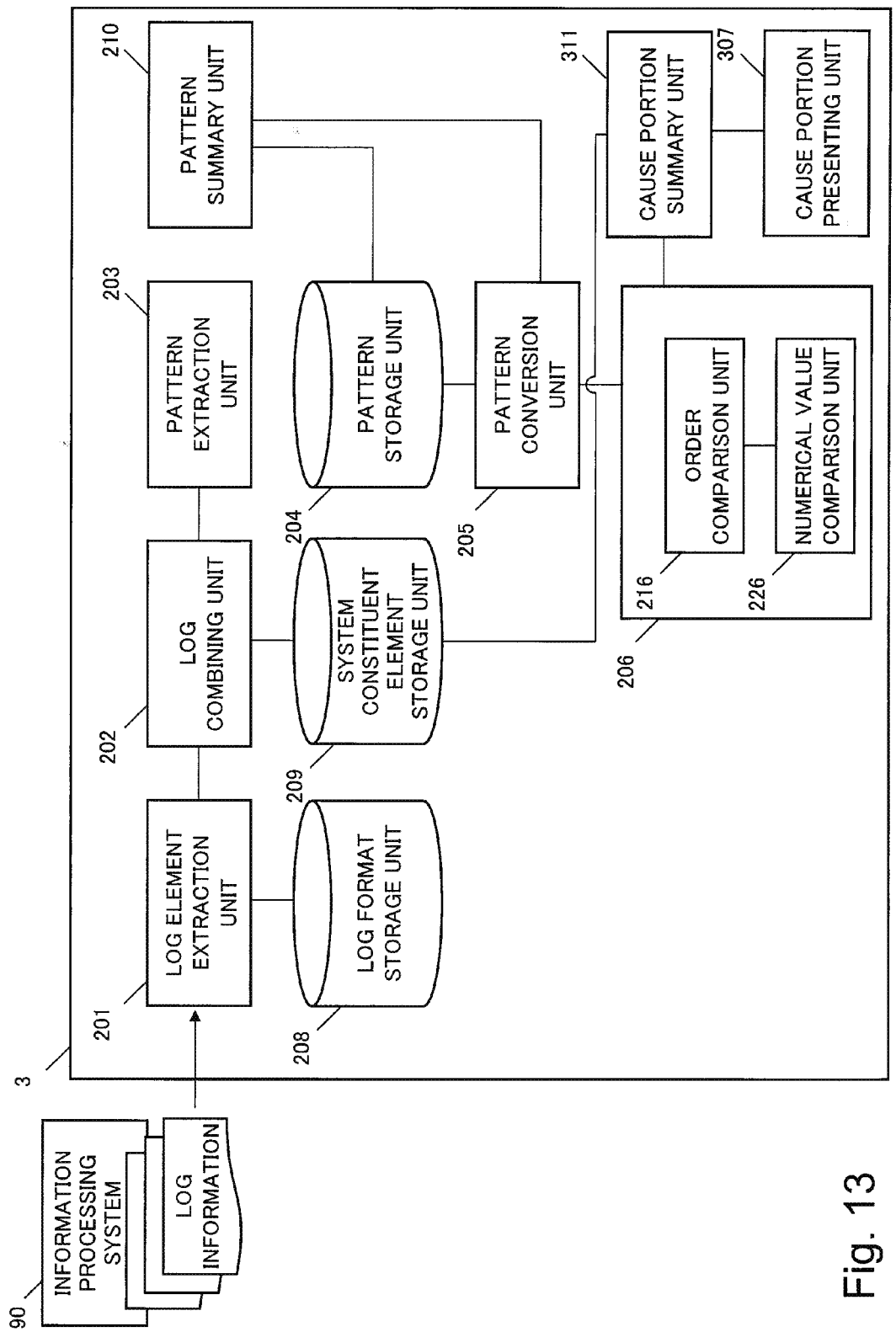
FIG. 13 is a functional block diagram illustrating functions of a fault analysis apparatus according to a third exemplary embodiment of the present invention.

First, a functional block diagram illustrating a functional configuration of a fault analysis apparatus 3 according to the third exemplary embodiment of the present invention is shown in FIG. 13. In FIG. 13, the fault analysis apparatus 3 is different from the fault analysis apparatus 2 according to the second exemplary embodiment of the present invention in that the fault analysis apparatus 3 includes a cause portion presenting unit 307 instead of the cause portion presenting unit 207 and further includes a cause portion summary unit 311. It should be noted that the cause portion summary unit 311 constitutes a part of an exemplary embodiment of the cause portion presenting unit according to the present invention.

In this case, the fault analysis apparatus 3 can be constituted by the computer apparatus having the hardware configuration explained with reference to FIG. 2 like the fault analysis apparatus 1 according to the first exemplary embodiment of the present invention. In this case, the cause portion summary unit 311 is constituted by a CPU 1001 that writes computer programs and various kinds of data stored in a ROM 1003 and a storage device 1004 to a RAM 1002 and executes the computer programs. The hardware configuration of the fault analysis apparatus 3 and the functional blocks thereof are not limited to the above configuration.

The cause portion summary unit 311 refers to the system constituent element storage unit 209 to summarize the attribute values possessed by the system constituent element information indicated by the identification information detected by the order comparison unit 216 and the numerical value comparison unit 226. For example, with regard to the corresponding system constituent element information, the value of the attribute "location" and the value of the attribute "classification 2" may be summarized.

The cause portion presenting unit 307 presents the system constituent element information indicated by the identification information which is input from the order comparison unit 216 and the numerical value comparison unit 226 on the basis of a summary result given by the cause portion summary unit 311. For example, the cause portion presenting unit 307 may present the corresponding system constituent element information in the descending order of the number of summaries of the predetermined attribute value.

For example, the identification information which is input from the order comparison unit 216 and the numerical value comparison unit 226 is assumed to be "X", "G", "K". In this case, when the information of the system constituent element storage unit 209 in FIG. 8 is referred to, the system constituent element "X" is "Application_Y" of "Node1", the system constituent element "G" is "Application_Z" of "Node1", and the system constituent element "K" is "Application_X" of "Node2". In this case, the cause portion summary unit 311 summarizes that there are two Nodes1 and one Node2 with regard to the attribute "location".

Therefore, the cause portion presenting unit 307 may present the system constituent element information about "X" and "G" of Node1 for which the number of summarizes of the attribute "location" is high, and the cause portion presenting unit 307 may present the system constituent element information about "K" having Node2 for which the number of summarizes is the second highest. In this case, the presenting order of the system constituent elements "X" and "G" are in parallel. In such case, the cause portion presenting unit 307 may determine the presenting order thereof further in view of the summary result of another attribute information. However, in this example, the attribute values of another attribute "classification 2" with regard to the system constituent elements "X" and "G" are one "Application_Y" and one "Application_Z", and therefore, the presenting order thereof is still in parallel. Therefore, the cause portion presenting unit 307 may present, in a random order or a parallel order, the system constituent element information of which summary results of the attribute information are the same. It should be noted that the presenting order may be a display order or a print order, or may be orders such as the size of an output character or the size of a display area. Alternatively, the presenting order may be an order defined to be able to express the order of the magnitude of the possibility that it could be the portion of the cause of the fault.

An operation of the fault analysis apparatus 3 configured as described above will be explained with reference to FIG. 14. The comparison target pattern extraction operation of the fault analysis apparatus 3 is the same as the comparison target pattern extraction operation of the fault analysis apparatus 2 of the second exemplary embodiment of the present invention explained with reference to FIG. 11, and therefore the explanation in the present exemplary embodiment is omitted.

Figure 14:
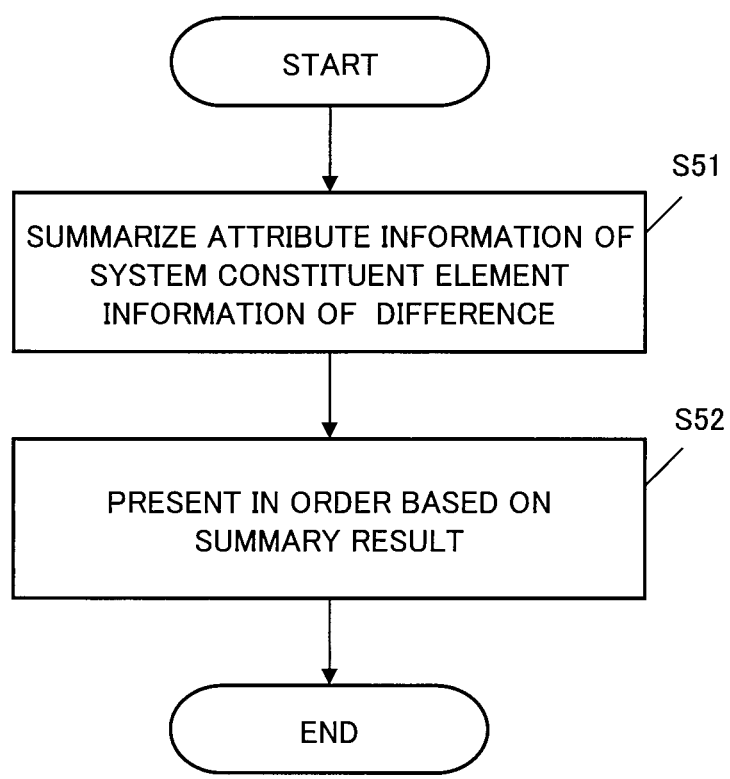
FIG. 14 is a flowchart for illustrating a cause portion presenting operation in the fault analysis apparatus according to the third exemplary embodiment of the present invention.

The fault analysis operation of the fault analysis apparatus 3 is substantially the same as the fault analysis operation of the fault analysis apparatus 3 according to the second exemplary embodiment of the present invention explained with reference to FIG. 12, but the details of the operation in step S48 is different. The cause portion presenting operation of the fault analysis apparatus 3 in step S48 is shown in FIG. 14.

First, the cause portion summary unit 311 refers to the system constituent element storage unit 209 to summarize the attribute information possessed by the system constituent element information indicated by the difference detected by the order comparison unit 216 and the numerical value comparison unit 226 (step S51).

Subsequently, the cause portion presenting unit 307 presents the system constituent element information indicated by the difference in a presenting order based on the summary result (step S52).

Hereinabove, the fault analysis apparatus 3 terminates the operation.

Subsequently, the effects of the third exemplary embodiment of the present invention will be described.

The fault analysis apparatus 3 according to the third exemplary embodiment of the present invention can present the information in the descending order of the possibility of being the portion of the cause of the fault that has not occurred in the past even in the information processing system of which configuration changes.

The reason for this is that the cause portion summary unit summarizes the attribute information about the system constituent element information detected as the difference, and presents the system constituent element information in the presenting order based on the summary result.

Accordingly, the fault analysis apparatus according to the present exemplary embodiment can more greatly save the user's work for analyzing the information presented as the portion of the cause and can make the user's work more efficient.

Fourth Exemplary Embodiment

Subsequently, the fourth exemplary embodiment of the present invention will be explained in details with reference to drawings. In each drawing referred to in the explanation about the present exemplary embodiment, the same configuration as the second exemplary embodiment of the present invention and the steps operating in a similar manner thereto are denoted with the same reference numerals, and detailed explanation thereabout is omitted in the present exemplary embodiment.

Figure 15:
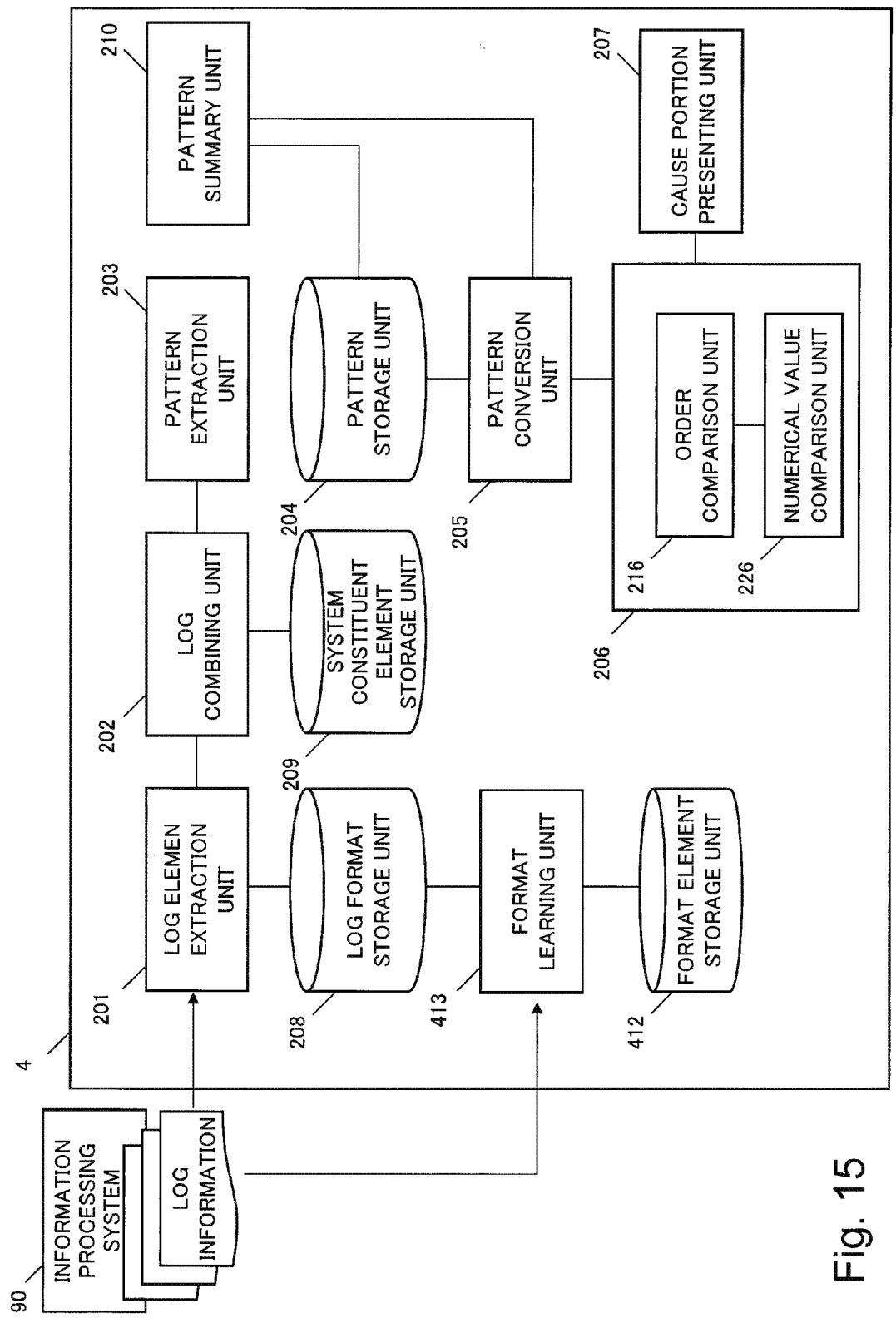
FIG. 15 is a functional block diagram illustrating a fault analysis apparatus according to a fourth exemplary embodiment of the present invention.

First, a functional block diagram illustrating a functional configuration of a fault analysis apparatus 4 according to the fourth exemplary embodiment of the present invention is shown in FIG. 15. In FIG. 15, the fault analysis apparatus 4 is different from the fault analysis apparatus 2 according to the second exemplary embodiment of the present invention in that the fault analysis apparatus 4 includes not only the same functional blocks as the fault analysis apparatus 2 according to the second exemplary embodiment of the present invention but also a format element storage unit 412 and a format learning unit 413.

In this case, the fault analysis apparatus 4 can be constituted by the computer apparatus having the hardware configuration explained with reference to FIG. 2 like the fault analysis apparatus 1 according to the first exemplary embodiment of the present invention. In this case, the format element storage unit 412 is constituted by a storage device 1004. The format learning unit 413 is constituted by a CPU 1001 that writes computer programs and various kinds of data stored in a ROM 1003 and a storage device 1004 to a RAM 1002 and executes the computer programs. The hardware configuration of the fault analysis apparatus 4 and the functional blocks thereof are not limited to the above configuration.

The format element storage unit 412 stores format element information expressing a format of a log element that could constitute log information. Examples of log elements that could constitute log information include various kinds of information such as "date", "time", "node name", "network address", "application name", "process name", "log level", "message main text", and the like. An example of format element information is shown in FIG. 16. In FIG. 16, the first line indicates regular expressions "¥d{4}/¥d{2}/¥d{2}", "¥D{3}/¥d{2}/¥d{4}", and the like could match a format of a log element "date" that could constitute log information. The third line of FIG. 16 indicates that any one of character strings "Node1", "Node2", "Node3", and the like match a format of a log element "Node" that could constitute log information.

The format learning unit 413 learns a format of a log element that could constitute log information by referring to the format element storage unit 412 with regard to the log information for which a format is not stored in the log format storage unit 208. Then, the format learning unit 413 stores the learned format of log information to the log format storage unit 208.

More specifically, the format learning unit 413 reads target log information, and searches the matching format element information stored in the format element storage unit 412. Then, information obtained by replacing the read log information with the matching format element information may be stored to the log format storage unit 208. At this occasion, for format element information expressed as a regular expression, the format learning unit 413 may replace the corresponding log element in the read log information with the matching regular expression. For format element information expressed as a candidate of a word, the format learning unit 413 may replace the corresponding log element in the read log information with a regular expression "¥w+?" and the like that expresses any given word. For example, suppose that information about the read log information is "2013/02/01 16:00:01 DEBUG connection failure". In this case, the format learning unit 413 searches a matching log element format by referring to the format element information of FIG. 16, and determines that the read log information matches each log element format of "date", "time", "log level", and "message". As shown in this example, the format learning unit 413 may determine that an element that matches none of the format element information is a log element "message". Then, in this case, the format learning unit 413 may store new log format information to the log format storage unit 208 as shown in FIG. 17.

An operation of the fault analysis apparatus 4 configured as described above will be explained with reference to FIG. 18.

Figure 18:
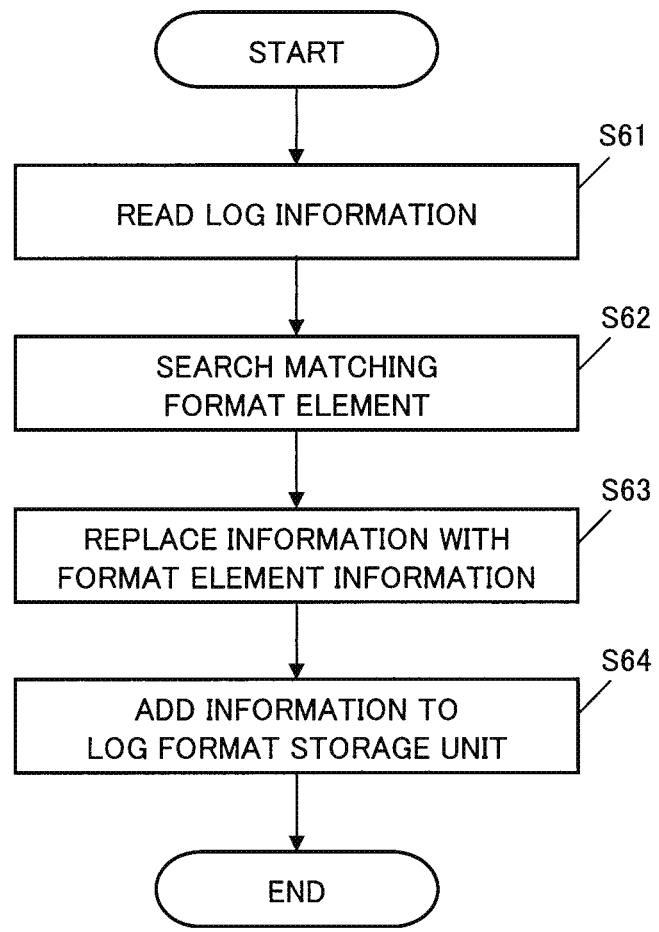
FIG. 18 is a flowchart for illustrating a format learning operation in the fault analysis apparatus according to the fourth exemplary embodiment of the present invention.

First, a format learning operation of the fault analysis apparatus 4 will be shown in FIG. 18. The fault analysis apparatus 4 may start the format learning operation upon receiving information for commanding start of learning of a format of log information from the input device 1006 or another functional block, not shown. In this case, for example, the fault analysis apparatus 4 may adopt, as a target, log information which is saved at a predetermined storage position and which is not stored in the log format storage unit 208. Alternatively, the fault analysis apparatus 4 may start the format learning operation when the fault analysis apparatus 4 receives log information about the format learning target from another functional block. Still alternatively, when the log element extraction unit 201 executes extraction processing of log elements, the fault analysis apparatus 4 may start the format learning operation upon detecting log information that is not stored in the log format storage unit 208.

In FIG. 18, first, the format learning unit 413 reads at least some of information from the target log information (step S61).

Subsequently, the format learning unit 413 searches, from the format element storage unit 412, the format element information that matches the information read in step S61 (step S62).

Subsequently, the format learning unit 413 replaces the information read in step S61 on the basis of the matching format element information in step S62 (step S63).

Subsequently, the format learning unit 413 adds the information generated in step S63 to the log format storage unit 208 as format information (step S64).

Hereinabove, the fault analysis apparatus 4 terminates the format learning operation.

The pattern extraction operation and fault analysis operation of the fault analysis apparatus 4 is the same as the fault analysis apparatus 2 according to the second exemplary embodiment of the present invention explained with reference to FIGS. 11 and 12, and therefore the explanation in the present exemplary embodiment is omitted.

Subsequently, the effects of the fourth exemplary embodiment of the present invention will be described.

The fault analysis apparatus 4 according to the fourth exemplary embodiment of the present invention can present the information capable of identifying the portion of the cause of the fault that has not occurred in the past even in the information processing system of which configuration changes even when log information of an unknown format is output because of a configuration change.

The reason for this is that the format element storage unit stores a format of a log element that could constitute log information, and the format learning unit generates format information by searching format element information that matches the log information of the unknown format, and stores the format information to the log format storage unit.

Accordingly, even when the format of the log information of the comparison target and the analysis target frequently changes due to a change of a configuration, the fault analysis apparatus according to the present exemplary embodiment can extract a log element from such log information, and can achieve the same effects as the second exemplary embodiment of the present invention.

In each of the exemplary embodiments of the present invention that has been explained above, an example where a node and a software component is applied as a system constituent element constituting an information processing system has been mainly explained. Alternatively, the system constituent elements in the present invention may be other elements as long as they are elements constituting an information processing system which is to be analyzed as to the faults.

In the second to fourth exemplary embodiments of the present invention that has been explained above, an example where the pattern extraction unit extracts a pattern of identification information about a system constituent element has been mainly explained. Alternatively, the pattern extraction unit may not only extract identification information about a system constituent element but also a pattern also including a log element and appended attribute information.

In the explanation about the second to fourth exemplary embodiments of the present invention that has been explained above, the pattern comparison unit first performs comparison in view of the order of the system constituent elements, and with regard to the analysis target pattern and the comparison target pattern of which orders are completely the same, the pattern comparison unit compares the relative ratios thereof. Alternatively, in each of the exemplary embodiments, the pattern comparison unit compares the analysis target pattern and the comparison target pattern as a set of system constituent element information without considering the order and the number of times of appearances. In this case, the pattern comparison unit may output, to the cause portion presenting unit, system constituent element information which is an element of a non-matching portion with regard to an analysis target pattern and a comparison target pattern in which a set of elements partially match each other. In this case, the pattern comparison unit may output, to the cause portion presenting unit, system constituent element information which is an element of which relative ratio does not match with regard to an analysis target pattern and a comparison target pattern in which a set of elements completely match each other.

In the explanation about the second to fourth exemplary embodiments of the present invention that has been explained above, the pattern comparison unit compares the number of appearances of the analysis target pattern and the comparison target pattern of which order completely matches each other. Alternatively, the pattern comparison unit may detect the difference on the basis of not only the relative ratio of the number of appearances but also other information thereof that can be calculated from the number of appearances.

In each of the exemplary embodiments of the present invention that has been explained above, when the system constituent element information indicated by the difference detected by the pattern comparison unit is system constituent element information converted by the pattern conversion unit, the cause portion presenting unit may present non-converted system constituent element information.

In each of the exemplary embodiments of the present invention that has been explained above, an example where each functional block of the fault analysis apparatus is achieved by the CPU executing a computer program stored in a storage device or a ROM has been mainly explained. Alternatively, some, all, or a combination of the functional blocks of the fault analysis apparatus may be achieved by dedicated hardware.

In each of the exemplary embodiments of the present invention that has been explained above, a functional block of the fault analysis apparatus may be achieved by being dispersed into multiple apparatus.

In each of the exemplary embodiments of the present invention that has been explained above, the operation of the fault analysis apparatus explained with reference to each flowchart may be stored to a storage device (storage medium) of a computer apparatus as a computer program of the present invention, and such computer program may be configured to be read and executed by the CPU. Then, in such case, the present invention is constituted by a code of such computer program or a storage medium.

Each of the exemplary embodiments that has been explained above can carried out by a combination as necessary.

The present invention is not limited to each of the exemplary embodiments that has been explained above, and can be carried out in various manners.

Some or all of each of the exemplary embodiments that has been explained above can also be described as the following Supplemental notes, but are not limited thereto.

(Supplemental Note 1)

A fault analysis apparatus including a log element extraction unit for extracting, from one or more pieces of log information which are output by an information processing system, an element (log element) which is an element constituting the log information, a log combining unit attaching, to each of the log elements, system constituent element information expressing a constituent element of the information processing system, the constituent element (system constituent element) related to the log element, and generating combined log information by combining the log elements attached with the system constituent element information, a pattern extraction unit for extracting a pattern of information including the system constituent element information from the combined log information, a pattern storage unit for storing a pattern during a comparison target period (comparison target pattern), a pattern comparison unit, when the pattern during an analysis target period (analysis target pattern) includes system constituent element information not included in the comparison target pattern (system constituent element information of conversion target), for performing a conversion between the system constituent element information of the conversion target and system constituent element information included in the comparison target pattern and similar to the system constituent element information of the conversion target in any one of the comparison target pattern and the analysis target pattern, a pattern comparison unit for detecting a difference by comparing the analysis target pattern and the comparison target pattern after conversion processing with the pattern conversion unit, and a cause portion presenting unit for presenting, as a portion of a cause of a fault, the system constituent element information indicated by the difference detected by the pattern comparison unit.

(Supplemental Note 2)

The fault analysis apparatus according to Supplemental note 1, wherein the pattern comparison unit detects a difference by comparing an order of the system constituent element information included in each of the analysis target pattern and the comparison target pattern.

(Supplemental Note 3)

The fault analysis apparatus according to Supplemental note 1 or 2, wherein the pattern comparison unit detects a difference by comparing information about a number of appearances of the system constituent element information included in each of the analysis target pattern and the comparison target pattern.

(Supplemental Note 4)

The fault analysis apparatus according to any one of Supplemental notes 1 to 3 further including a system constituent element storage unit configured to store related in association with related information of each of the log information, wherein the log combined unit identifies and attaches, to each of the log elements, the related system constituent element information on the basis of the related information of the log information from which the log element is extracted.

(Supplemental Note 5)

The fault analysis apparatus according to Supplemental note 4, wherein the system constituent element storage unit stores identification information about a system constituent element so as to be included in the system constituent element information, the log combining unit generates the combined log information by attaching, to each of the log elements, at least the identification information about the system constituent element related, and the pattern extraction unit extracts a pattern of the identification information about the system constituent element.

(Supplemental Note 6)

The fault analysis apparatus according to Supplemental note 4 or 5, wherein the system constituent element storage unit stores attribute information expressing an attribute of the system constituent element so as to be included in the system constituent element information, and the pattern conversion unit refers to the system constituent element storage unit to identify, as the similar system constituent element information, system constituent element having attribute information satisfying a predetermined similar condition with regard to attribute information possessed by the system constituent element of the conversion target.

(Supplemental Note 7)

The fault analysis apparatus according to any one of Supplemental notes 1 to 6 further including a log format storage unit configured to store, with regard to the log information, a format of a log element constituting the log information, wherein the log element extraction unit refers to the log format storage unit to extract the log element from the log information.

(Supplemental Note 8)

The fault analysis apparatus according to Supplemental note 7 further including: a format element storage unit configured to store format element information expressing a format of a log element that could constitute the log information; a format learning unit configured to learn, with regard to log information of which format is not stored in the log format storage unit, a format of a log element constituting the log information by referring to the format element storage unit, and store the format to the log format storage unit.

(Supplemental Note 9)

The fault analysis apparatus according to any one of Supplemental notes 1 to 8, wherein, with regard to the system constituent element information indicated by the difference detected by the pattern comparison unit, the cause portion presenting unit presents, as the portion of the cause of the fault, the system constituent element information on the basis of a ratio of appearance of an analysis target pattern or a comparison target pattern in which the difference is detected.

(Supplemental Note 10)

The fault analysis apparatus according to any one of Supplemental notes 1 to 9, wherein the cause portion presenting unit presents, as the portion of the cause of the fault, the system constituent element information on the basis of a summary result of attribute information possessed by the system constituent element information indicated by the difference detected by the pattern comparison unit.

(Supplemental Note 11)

The fault analysis apparatus according to any one of Supplemental notes 1 to 10, wherein the pattern conversion unit converts the similar system constituent element information in the comparison target pattern into the system constituent element information of the conversion target.

(Supplemental Note 12)

The fault analysis apparatus according to any one of Supplemental notes 1 to 10, wherein the pattern conversion unit converts the system constituent element information of the conversion target in the analysis target pattern to the similar system constituent element information.

(Supplemental Note 13)

A fault analysis method including extracting, from one or more pieces of log information which are output by an information processing system, an element (log element) which is an element constituting the log information, attaching, to each of the log elements, system constituent element information expressing a constituent element of the information processing system, the constituent element (system constituent element) related to the log element, and generating combined log information by combining the log elements attached with the system constituent element information, extracting a pattern of information including the system constituent element information from the combined log information, and when a pattern during an analysis target period (analysis target pattern) includes system constituent element information (system constituent element information of conversion target) not included in a pattern during a comparison target period (comparison target pattern), performing the conversion between the system constituent element information of the conversion target and system constituent element information included in the comparison target pattern and similar to the system constituent element information of the conversion target in any one of the comparison target pattern and the analysis target pattern, detecting a difference by comparing the analysis target pattern and the comparison target pattern after conversion processing, and presenting, as a portion of a cause of a fault, the system constituent element information indicated by the difference detected.

(Supplemental Note 14)

A computer program for causing a computer apparatus to execute a log element extraction step for extracting, from one or more pieces of log information which are output by an information processing system, an element (log element) which is an element constituting the log information, a log combined step for attaching, to each of the log elements, system constituent element information expressing a system constituent element related to the log element which is a constituent element of the information processing system (system constituent element), and generating combined log information by combining the log elements attached with the system constituent element information, a pattern extraction step for extracting a pattern of information including the system constituent element information from the combined log information, a pattern storing step for storing a pattern (comparison target pattern) extracted by executing the log element extraction step, the log combined step, and the pattern extraction step on the log information during a comparison target period, a pattern conversion step, when a pattern (analysis target pattern) extracted by executing the log element extraction step, the log combined step, and the pattern extraction step on the log information during an analysis target period includes system constituent element information not included in the comparison target pattern (system constituent element information of conversion target), for performing the conversion between the system constituent element information of the conversion target and system constituent element information included in the comparison target pattern and similar to the system constituent element information of the conversion target in any one of the comparison target pattern and the analysis target pattern, a pattern comparison step for detecting a difference by comparing the analysis target pattern and the comparison target pattern after conversion processing, and a cause portion presenting step for presenting, as a portion of a cause of a fault, the system constituent element information indicated by the difference detected in the pattern comparison step.

This application claims the priority based on Japanese Patent Application No. 2013-116952 filed on Jun. 3, 2013, and the entire disclosure thereof is incorporated herein by reference.

REFERENCE SIGNS LIST 1, 2, 3, 4 fault analysis apparatus
90 information processing system
101, 201 log element extraction unit
102, 202 log combining unit
103, 203 pattern extraction unit
104, 204 pattern storage unit
105, 205 pattern conversion unit
106, 206 pattern comparison unit
107, 207, 307 cause portion presenting unit
208 log format storage unit
209 system constituent element storage unit
210 pattern summary unit
216 order comparison unit
226 numerical value comparison unit
311 cause portion summary unit
412 format element storage unit
413 format learning unit
1001 CPU
1002 RAM
1003 ROM
1004 storage device
1005 network interface
1006 input device
1007 output device

The invention claimed is:

1. A fault analysis apparatus comprising:
a log element extraction unit configured to extract, from one or more pieces of log information which are output by an information processing system, a log element which is an element constituting the log information;
a log combined unit configured to attach, to each of the log elements, system constituent element information expressing a system constituent element related to the log element, the system constituent element being a constituent element of the information processing system, and generate combined log information by combining the log elements attached with the system constituent element information;
a pattern extraction unit configured to extract a pattern of information including the system constituent element information from the combined log information;
a pattern conversion unit, using an analysis target pattern, being the pattern extracted during an analysis target period in which an analysis is performed, and when the analysis target pattern includes system constituent element information of a conversion target which is system constituent element information not included in a comparison target pattern being a pattern stored in a pattern storage unit and being the pattern extracted during a comparison target period which is a period when a conversion is performed, configured to perform the conversion between the system constituent element information of the conversion target and the system constituent element information included in the comparison target pattern and similar to the system constituent element information of the conversion target in any one of the comparison target pattern and the analysis target pattern;
a pattern comparison unit configured to detect a difference by comparing the analysis target pattern and the comparison target pattern after conversion processing with the pattern conversion unit; and
a cause portion presenting unit configured to present, as a portion of a cause of a fault, the system constituent element information indicated by the difference detected by the pattern comparison unit.

2. The fault analysis apparatus according to claim 1, wherein the pattern comparison unit detects a difference by comparing an order of the system constituent element information included in each of the analysis target pattern and the comparison target pattern.

3. The fault analysis apparatus according to claim 1, wherein the pattern comparison unit detects a difference by comparing information about a number of appearances of the system constituent element information included in each of the analysis target pattern and the comparison target pattern.

4. The fault analysis apparatus according to claim 1 further comprising a system constituent element storage unit configured to store related in association with related information of each of the log information,
wherein the log combined unit identifies and attaches, to each of the log elements, the related system constituent element information on the basis of the related information of the log information from which the log element is extracted.

5. The fault analysis apparatus according to claim 4, wherein the system constituent element storage unit stores identification information for identifying the system constituent element so as to be included in the system constituent element information, the log combined unit generates the combined log information by attaching, to each of the log elements, at least the identification information about the system constituent element related, and the pattern extraction unit extracts a pattern of the identification information about the system constituent element.

6. The fault analysis apparatus according to claim 4, wherein the system constituent element storage unit stores attribute information expressing an attribute of the system constituent element so as to be included in the system constituent element information, and the pattern conversion unit refers to the system constituent element storage unit to identify, as the similar system constituent element information, system constituent element information having attribute information satisfying a predetermined similar condition with regard to attribute information possessed by the system constituent element information of the conversion target.

7. The fault analysis apparatus according to claim 1 further comprising a log format storage unit configured to store, with regard to the log information, a format of a log element constituting the log information, wherein the log element extraction unit refers to the log format storage unit to extract the log element from the log information.

8. The fault analysis apparatus according to claim 7 further comprising:

a format element storage unit configured to store format element information expressing a format of a log element that could constitute the log information;

a format learning unit configured to learn, with regard to log information of which format is not stored in the log format storage unit, a format of a log element constituting the log information by referring to the format element storage unit, and store the format to the log format storage unit.

9. A fault analysis method of a fault analysis apparatus, comprising:

extracting, from one or more pieces of log information which are output by an information processing system, a log element which is an element constituting the log information;

attaching, to each of the log elements, system constituent element information expressing a system constituent element related to the log element, the system constituent element being a constituent element of the information processing system, and generating combined log information by combining the log elements attached with the system constituent element information;

extracting a pattern of information including the system constituent element information from the combined log information;

using an analysis target pattern, which is the pattern extracted during an analysis target period in which an analysis is performed, and when the analysis target pattern includes system constituent element information of a conversion target which is system constituent element information not included in a comparison target pattern which is a pattern extracted during a comparison target period which is a period when a conversion is performed, performing the conversion between the system constituent element information of the conversion target and system constituent element information included in the comparison target pattern and similar to the system constituent element information of the conversion target in any one of the comparison target pattern and the analysis target pattern;

detecting a difference by comparing the analysis target pattern and the comparison target pattern after conversion processing; and presenting, as a portion of a cause of a fault, the system constituent element information indicated by the difference detected.

10. A non-transitory computer-readable recording medium recording a computer program for causing a computer apparatus to execute:

a log element extraction step for extracting, from one or more pieces of log information which are output by an information processing system, a log element which is an element constituting the log information;

a log combined step for attaching, to each of the log elements, system constituent element information expressing a system constituent element related to the log element, the system constituent element being a constituent element of the information processing system, and generating combined log information by combining the log elements attached with the system constituent element information;

a pattern extraction step for extracting a pattern of information including the system constituent element information from the combined log information;

a pattern storing step for storing a comparison target pattern which is a pattern extracted by executing the log element extraction step, the log combined step, and the pattern extraction step on the log information during a comparison target period which is a period when a conversion is performed;

a pattern conversion step, using an analysis target pattern which is the pattern, extracted by executing the log element extraction step, the log combined step, and the pattern extraction step on the log information during an analysis target period in which an analysis is performed, and when the analysis target pattern includes system constituent element information of a conversion target which is system constituent element information not included in the comparison target pattern, performing the conversion between the system constituent element information of the conversion target and system constituent element information included in the comparison target pattern and similar to the system constituent element information of the conversion target in any one of the comparison target pattern and the analysis target pattern;

a pattern comparison step for detecting a difference by comparing the analysis target pattern and the comparison target pattern after conversion processing; and a cause portion presenting step for presenting, as a portion of a cause of a fault, the system constituent element information indicated by the difference detected in the pattern comparison step.

* * * * *